United States Patent
Sakai

(10) Patent No.: US 6,775,039 B2
(45) Date of Patent: Aug. 10, 2004

(54) DRIVING CIRCUIT FOR AN OPTICAL SCANNER

(75) Inventor: Nobuaki Sakai, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/193,684

(22) Filed: Jul. 12, 2002

(65) Prior Publication Data

US 2003/0090771 A1 May 15, 2003

(30) Foreign Application Priority Data

| Jul. 13, 2001 | (JP) | ........................................ | 2001-214178 |
| Jul. 27, 2001 | (JP) | ........................................ | 2001-228112 |
| Jul. 27, 2001 | (JP) | ........................................ | 2001-228113 |
| Jul. 27, 2001 | (JP) | ........................................ | 2001-228114 |

(51) Int. Cl.[7] ............................................. G02B 26/08
(52) U.S. Cl. ........................ 359/198; 359/199; 359/223; 359/224
(58) Field of Search ................................ 359/198, 199, 359/223, 224, 214; 310/68 B

(56) References Cited

U.S. PATENT DOCUMENTS

| 4,919,500 A | 4/1990 | Paulsen |
| 4,990,808 A | 2/1991 | Paulsen |
| 6,188,504 B1 * | 2/2001 | Murakami et al. .......... 359/224 |
| 2002/0051332 A1 * | 5/2002 | Miyajima et al. ........... 361/187 |

FOREIGN PATENT DOCUMENTS

| JP | 07-175005 | 7/1995 |
| JP | 09-101474 | 4/1997 |
| JP | 10-123449 | 5/1998 |
| JP | 11-242180 | 9/1999 |

* cited by examiner

Primary Examiner—Thong Nguyen
Assistant Examiner—Denise S. Allen
(74) Attorney, Agent, or Firm—Pillsbury Winthrop LLP

(57) ABSTRACT

A driving circuit for an optical scanner includes an oscillation driving device for oscillating a moving plate, an oscillation detecting device for detecting the oscillating condition of the moving plate, an oscillating frequency control device for controlling the amplitude of a torsional oscillation of the moving plate, and an oscillating amplitude control device for controlling the amplitude of the torsional oscillation of the moving plate. The driving circuit is thus constructed so that the oscillation of a scanner can be controlled with a high degree of accuracy.

24 Claims, 27 Drawing Sheets

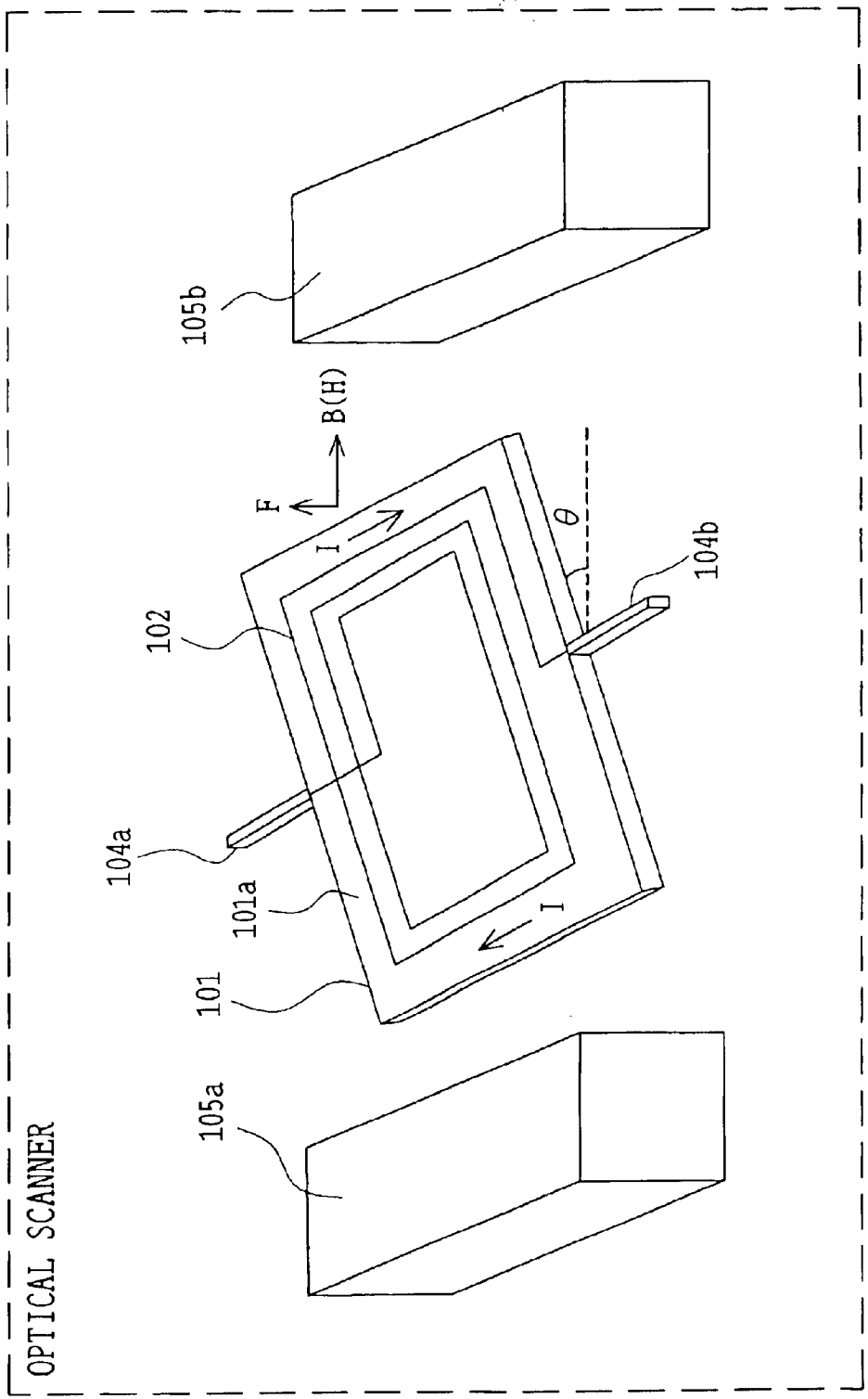

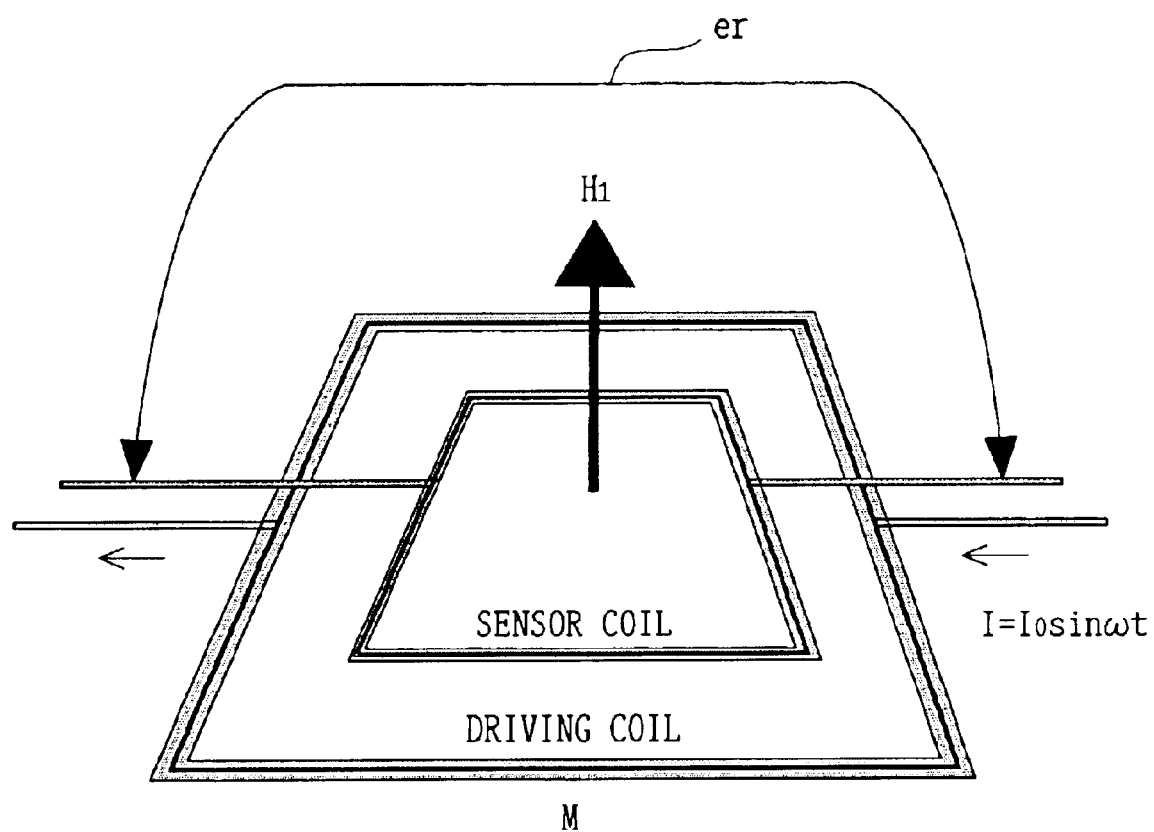

SUPERPOSITON

DRIVING CIRCUIT FOR AN OPTICAL SCANNER

BACKGROUND OF THE INVENTION

1. Field of the Invention

This invention relates to a driving circuit for an optical scanner in which light from a light source is reflected and an optical scanner performing a one- or two-dimensional scan with this reflected light is driven.

2. Description of the Related Art

Some of conventional optical scanners are disclosed in Japanese Patent Kokai Nos. Hie 7-175005 and Hie 10-123449. Each of these optical scanners is fabricated by semiconductor manufacturing technology and has the features of compactness and small thickness.

FIG. 1 shows a diagram for illustrating an operating principle of the optical scanner. As shown in this figure, the optical scanner includes a mirror portion 101 in which a coil pattern (a driving coil 102) is provided parallel with a mirror face 101a; spring portions 104a and 104b for oscillating the mirror portion 101; and permanent magnets 105a and 105b arranged close to the mirror portion 101, for producing a magnetic field nearly parallel with the mirror face 101a where the mirror portion 101 is in a stationary state. The spring portions 104a and 104b are connected to a support, not shown, to be fixed to an arbitrary member. By supplying an alternating current (of a frequency t) to the driving coil 102, a force obeying the left-hand rule is generated in a direction normal to the mirror face 101a to oscillate the mirror portion 101 at the frequency f.

When the alternating current is represented by I (=$I_0$ sin ($2\pi f t$)), the strength of the magnetic field by H (a magnetic flux density B), the number of turns of the coil by N, the area of the coil by S, and a vacuum magnetic constant by $\mu_0$, an oscillating angle θ and a generating force F in this case have the relation expressed by the following equation:

$$F = \mu_0 N H S I_0 \sin(2\pi f t) \cdot \cos\theta \tag{1}$$

The oscillating angle θ can be found by solving the following equation of motion:

$$\ddot{\theta} = -k\theta - D\dot{\theta} + \frac{F}{J} \tag{2}$$

Here, k is a torsion spring constant of the spring portion and has the relation of k=$(2\pi f_c)^2$, where $f_c$ is a mechanical resonant frequency of the optical scanner, D is an attenuation coefficient, and J is the moment of inertia of the optical scanner.

The relation between the oscillating angle θ and the frequency f of the alternating current, in which the oscillating angle θ is thought of as small, can be expressed from Eqs. (1) and (2) by the following equation:

$$\theta(f) = \frac{\mu_0 N H S I_0}{J} \sqrt{\frac{1}{\{k - (2\pi f)^2\}^2 + D^2 (2\pi f)^2}} \tag{3}$$

FIG. 2A shows a plot of Eq. (3). As shown in FIG. 2A, the maximum oscillating angle (oscillating amplitude) is obtained when the driving frequency f of the alternating current is caused to coincide with the mechanical resonant frequency $f_c$.

From this reason, it is a common practice for the drive of the optical scanner to cause the frequency of a driving signal to coincide with the mechanical resonant frequency of the optical scanner.

In order to stabilize the drive of the optical scanner mentioned above, it is necessary to provide a sensor for detecting the oscillating condition of the optical scanner. In the optical scanner using such a sensor, as disclosed, for example, in Japanese Patent Kokai No. Hie 11-242180, it is known that, in addition to the structure of FIG. 1, a coil pattern (hereinafter referred to as a sensor coil 103), different from the driving coil 102, is provided nearly concentrically on the same plane as the driving coil 102 in the mirror portion 101 (see FIG. 3), and when the mirror portion 101 is oscillated, an electromotive force generated by the interlinkage of the sensor coil 103 with the magnetic field is detected and thereby the oscillating condition is detected.

Here, in the technique of detecting the oscillating condition of the optical scanner of the structure mentioned above, an electromotive force $V_r$ generated in the sensor coil 103 is given by the following equation:

$$V_r = N_s B S_s \dot{\theta} \cdot \cos\theta \tag{4}$$

where $N_s$ is the number of turns of the sensor coil, B is the magnetic flux density, and $S_s$ is the area of the sensor coil.

Now, consider the case where the optical scanner is driven with the mechanical resonant frequency $f_c$. When the driving signal is expressed as I=$I_0$ sin ($2\pi f_c t$), the oscillation of the optical scanner is retarded in phase by 90° with respect to the driving signal, thus giving $$\theta = -\theta_0 \cdot \cos(2\pi f_c t) \tag{5}$$

Therefore, the electromotive force $V_r$ expressed by Eq. (4), in which the oscillating angle θ ($\theta_0$) is thought of as small, can be approximated by the following equation:

$$V_r = N_s B S_s \theta_0 2\pi f_c \cdot \sin(2\pi f_c t) \cdot \cos\{-\theta_0 \cdot \cos(2\pi f_c t)\} \tag{6}$$

$$\approx N_s B S_s \theta_0 2\pi f_c \cdot \sin(2\pi f_c t)$$

Whereby, it is found that the electromotive force generated in the sensor coil is 90° ahead in phase with respect to the oscillation of the optical scanner. (Also, if the connections of both ends of the coil are replaced, the sign of the electromotive force will reverse and the phase will be retarded by 90°, and the following description is given on the basis of this practice.) Thus, in the resonant frequency drive, the phase relations of the driving signal, the drive of the optical scanner, and the electromotive force of the sensor coil (a sensor signal) are as shown in FIGS. 4A, 4B, and 4C, respectively, and the driving signal (FIG. 4A) coincides in phase with the sensor signal (FIG. 4C).

Here, where the optical scanner is driven at an arbitrary frequency which is much lower than the resonant frequency, the oscillation of the optical scanner, when the driving signal is expressed as I=$I_0$ sin($2\pi f t$), coincides in phase with the driving signal, thus giving $$\theta = -\theta_0 \cdot \sin(2\pi f t) \tag{7}$$

Therefore, the electromotive force $V_r$ expressed by Eq. (4), in which the oscillating angle θ ($\theta_0$) is thought of as small, can be approximated by the following equation:

$$V_r = N_s B S_s \theta_0 2\pi f \cdot \cos(2\pi f t) \cdot \cos\{\theta_0 \cdot \sin(2\pi f t)\} \tag{8}$$

-continued $$\approx N_s BS_s \theta_0 2\pi f \cdot \cos(2\pi f t)$$

A common control driving circuit for operating the optical scanner with stability is disclosed in Japanese Patent Kokai No. Hie 09-101474. This control driving circuit has a frequency follow-up control function (a positive feedback control function) for always driving the optical scanner with the resonant frequency and an amplitude control function (a negative feedback control function) for operating the optical scanner with stability at a desired oscillating amplitude.

However, when the control drive of the optical scanner with the sensor is made, the following problem ① arises.

Specifically, the sensor signal (the electromotive force produced in the sensor coil), as shown in Eq. (6) or (8), is proportional to the driving frequency. Consequently, when resonant frequency follow-up control such as that described in Kokai No. Hie 09-101474 is made, the mechanical resonant frequency of the optical scanner fluctuates due to changes of ambience and with age, and thereby the sensor signal is changed, that is, a sensor sensitivity as an oscillating angle sensor is varied, although the oscillating angle is not altered. This gives rise to a vital problem for high-precision amplitude control. Even when the optical scanner is driven at a frequency which is much lower than the resonant frequency, the sensor signal (sensor sensitivity) varies with the driving frequency, and thus the amplitude control becomes difficult.

Briefly described here is a fundamental control driving technique of the conventional optical scanner. An optical scanner 1 is controlled by circuitry shown in FIG. 5. In FIG. 5, from an operating controller such as a PC, not shown, a control signal which is a command value of the desired driving condition of the optical scanner 1, such as the oscillating amplitude (oscillating angle) or oscillating frequency of the optical scanner 1, is supplied to a control circuit 4. The control circuit 4, when receiving the control signal, outputs a driving command signal $V_d$ to a driving circuit 2. The driving circuit 2 outputs a driving signal (the alternating current) to the driving coil 102 in accordance with the driving command signal $V_d$. The optical scanner 1 is thus oscillated at desired oscillating angle and oscillating frequency. In this case, at both ends of the sensor coil is 5103, when the sensor coil 103 is interlinked with the magnetic field produced by the permanent magnets 105a and 105b, the electromotive force (the sensor signal) is generated. This electromotive force (the sensor signal) is feedbacked to the control circuit 4 as a detecting signal $V_s$ detected by a detecting circuit 3. In the control circuit 4, the detecting signal $V_s$ is monitored so that when the oscillating amplitude (the oscillating angle) or oscillating frequency of the optical scanner 1 is out of a desired value, the driving command signal $V_d$ output to the driving circuit 2 is compensated. In this way, the optical scanner 1 can be controlled and driven with stability.

Subsequently, general constructions of the driving circuit 2 and a detecting circuit 3-a are shown in FIG. 6. As shown in this figure, the driving circuit 2 includes an operational amplifier 201 and a resistance element (R0) 202 so that they convert the driving command signal $V_d$ into the driving signal (the alternating current).

Here, when the driving signal supplied to the driving coil 102 is expressed as $I=I_0 \sin(2\pi f_c t)=I_0 \sin(\omega_c t)$, the relation between the driving command signal $V_d$ and the driving signal (the alternating current) is given by the following equation:

$$V_d = R_0 \cdot I = R_0 \cdot I_0 \sin(\omega_c t) \quad (9)$$

The detecting circuit 3-a includes an operational amplifier 301, a resistance element (R1) 302, a resistance element (R1) 303, a resistance element (R2) 304, and a resistance element (R2) 305 so that they convert the electromotive force (the sensor signal) into the detecting signal $V_s$.

Here, when the electromotive force is denoted by $V_r$, the resistance value of the sensor coil is denoted by $R_{sens}$, and the self-inductance and wiring capacity of the sensor coil 103 are assumed to be negligible, the relation between the electromotive force $V_r$ and the detecting signal $V_s$ is given by the following equation:

$$V_s = \frac{-2R_2}{2R_1 + R_{sens}} \cdot V_r \quad (10)$$

However, the conventional optical scanner has the following problem ②.

Specifically, when the driving signal (the alternating current) I is supplied to the driving coil, as shown in FIG. 7, a magnetic field $H_1$ proportional to the driving signal I is produced in a direction perpendicular to the driving coil. In this case, since the conventional optical scanner is such that the driving coil and the sensor coil are nearly concentric and are provided on the same plane, an electromotive force (hereinafter referred to as a mutual induction electromotive force) $e_r$ attributable to a change of the strength of the magnetic field $H_1$ is generated in the sensor coil. The mutual induction electromotive force $e_r$ is proportional to a mutual inductance M caused by the driving coil and the sensor coil and the time differential of the driving signal I, and when the driving signal is expressed as $I=I_0 \sin(2\pi f_c t)=I_0 \sin(\omega_c t)$ and a factor of proportionality is denoted by $\alpha$, it can be expressed by the following equation:

$$e_r = \alpha \cdot M \cdot I \left(\text{or } \frac{dI}{dt}\right) = \alpha M \omega_c I_0 \cos(\omega_c t) \quad (11)$$

From the above description, it is found that the electromotive force (the sensor signal) actually generated in the sensor coil is not only the electromotive force $V_r$ expressed by Eq. (4), but also the sum with the mutual induction electromotive force $e_r$ expressed by Eq. (11), namely ($V_r + e_r$).

Thus, the true detecting signal $V_s$ is given from Eq. (10) by the following equation:

$$V_s = \frac{-2R_2}{2R_1 + R_{sens}} \cdot (V_r + e_r) \quad (12)$$

and a distorted signal is obtained due to the term of the mutual induction electromotive force $e_r$. With this signal, it is difficult to control the oscillating amplitude of the optical scanner with a high degree of accuracy. Also, the phase relations of the driving signal in the resonant frequency drive, the mutual induction electromotive force $e_r$, and a true electromotive force (sensor signal) are shown in FIGS. 8A, 8B, and 8C, respectively, and the actual oscillating condition and the sensor signal will be out of phase. This signifies that it becomes difficult to control the oscillating frequency of the optical scanner with a high degree of accuracy.

The control driving circuit of the conventional optical scanner has the following problem ③.

Specifically, the optical scanner mentioned above, theoretically, executes an oscillating motion with single frequency as in Eq. (5) or (7), but actually executes the oscillating motion with a plurality of frequency components, as shown in Eq. (13) or (14) to be described blow, under the influence of an electric noise, mechanical vibrating noise, or magnetic noise.

$$\theta(t) = -\theta_0\{1 + \alpha \sin(2\pi f_\alpha t + \theta_\alpha)\}\cos(2\pi f_c t) + \beta \sin(2\pi f_\beta t + \theta_\beta) \quad (13)$$

$$\theta(t) = \underbrace{\theta_0\{1 + \alpha\sin(2\pi f_\alpha t + \varphi_\alpha)\}\sin(2\pi f t)}_{(I)} + \underbrace{\beta\sin(2\pi f_\beta t + \varphi_\beta)}_{(II)} \quad (14)$$

Eq. (13) or (14) is briefly described below. The first term indicated by (I), as shown in FIG. 9A, exhibits a state where an amplitude-modulation noise is produced with respect to a desired oscillating motion of the optical scanner. The second term indicated by (II), as shown in FIG. 9B, exhibits a state where the center of oscillation fluctuates (alternating offset is produced) with respect to the oscillating motion of the optical scanner. An actual oscillating motion of the optical scanner, as shown in FIG. 9C, is in a state where the oscillations of (I) and (II) are superimposed. (Also, in the present invention, the noise of a higher frequency than in the desired oscillating motion of the optical scanner is thought of as negligible. This is because, as seen from the oscillating characteristics of FIGS. 2A and 2B, it is hard to affect the oscillating motion of the optical scanner by the noise of a high frequency.)

Since the control driving circuit of the conventional optical scanner has an amplitude control function for operating the optical scanner with stability at a desired oscillating amplitude, the amplitude-modulation noise of (I) can be eliminated. The optical scanner, however, is constructed so that the fluctuation of the center of the oscillation of (II) cannot be eliminated. As such, there is the problem that the optical scanner cannot be driven with a high degree of accuracy.

Here, referring back to FIG. 6, the relation between the driving command signal $V_d$ and the driving signal I (the alternating current) is given by the following equation:

$$I = \frac{V_d}{R_0} \quad (15)$$

Although each of a detecting circuit 3-b shown in FIG. 10 and a detecting circuit 3-c in FIG. 11 cannot be expected to provide a detecting function with a high degree of accuracy as in the detecting circuit 3-a of a differential type, it is effective as the detecting circuit and thus its construction is briefly described below.

The detecting circuit 3-b shown in FIG. 10 includes an operational amplifier 310, a resistance element (R3) 311, and a resistance element (R4) 312 so that they convert the electromotive force (the sensor signal) into the detecting signal $V_s$.

Here, again, when the electromotive force is denoted by $V_r$, the resistance value of the sensor coil is denoted by $R_{sens}$, and the self-inductance and wiring capacity of the sensor coil 103 are assumed to be negligible, the relation between the electromotive force $V_r$ and the detecting signal $V_s$ in the detecting circuit 3-b can be expressed as $$V_s = \frac{R_4}{R_3 + R_{sens}} \cdot V_r \quad (16)$$

The detecting circuit 3-c shown in FIG. 11 includes an operational amplifier 320 and a resistance element (R5) 321 so that they convert the electromotive force (the sensor signal) into the detecting signal $V_s$.

Here, again, when the electromotive force is denoted by $V_r$, the resistance value of the sensor coil is denoted by $R_{sens}$, and the self-inductance and wiring capacity of the sensor coil 103 are assumed to be negligible, the relation between the electromotive force $V_r$ and the detecting signal $V_s$ in the detecting circuit 3-c can be expressed as $$V_s = \frac{R_5}{R_5 + R_{sens}} \cdot V_r \quad (17)$$

However, the driving circuit of the conventional optical scanner has the following problem ④. As shown in Eqs. (10), (16) and (17), the detecting signal $V_s$ is provided with the resistance value of the sensor coil, and when the resistance value of the sensor coil fluctuates due to a change of ambient and with age, the detecting signal $V_s$ is changed thereby. Furthermore, the sensor coil is placed close to the driving coil, and it is conceivable that the sensor coil is affected by the generation of heat of the driving coil. When the detecting signal $V_s$ is changed by the fluctuation of the resistance value of the sensor coil, it is impossible to detect the oscillating condition of the optical scanner with a high degree of accuracy.

SUMMARY OF THE INVENTION

In order to solve the problem ①, it is a first object of the present invention to provide a driving circuit for an optical scanner in which amplitude control can be attained with a high degree of accuracy without undergoing the influence of a change in the driving frequency of the optical scanner.

In order to solve the problem ②, it is a second object of the present invention to provide a driving circuit for an optical scanner in which an operation can be performed with a high degree of accuracy at desired amplitude and frequency by eliminating the mutual induction electromotive force generated in the sensor coil.

In order to solve the problem ③, it is a third object of the present invention to provide a driving circuit for an optical scanner in which the fluctuation of the center of the oscillation of the optical scanner can be eliminated and amplitude control can be attained with a high degree of accuracy.

In order to solve the problem ④, it is a fourth object of the present invention to provide a driving circuit for an optical scanner in which the oscillating condition of the optical scanner can be detected without undergoing the influence of the fluctuation of the resistance value of the sensor coil and amplitude control can be attained with a high degree of accuracy.

In order to achieve the first object, the driving circuit for an optical scanner according to present invention includes a support to be fixed to an arbitrary member; a moving plate, at least one surface of which reflects light; elastic members connecting the support and the moving plate; magnets arranged close to the moving plate at preset distances; a driving coil provided on the moving plate; and a sensor coil provided on the moving plate. In this case, the driving circuit has a current supplying device for supplying a current containing at least an alternating-current component to the driving coil; a detecting device for detecting an induced electromotive force generated in the sensor coil to output a detecting signal corresponding to the induced electromotive force; and a control device for controlling the current supplied to the driving coil by the current supplying device in accordance with the detecting signal output by the detecting device. The control device has an oscillating frequency control device for controlling the frequency of torsional oscillation of the moving plate; a gain circuit for applying gain inversely proportional to the frequency of torsional oscillation of the moving plate to the detecting signal, at least, in the frequency band close to the frequency; and an amplitude control device for controlling the oscillating amplitude of the torsional oscillation of the moving plate in accordance with the output of the gain circuit.

According to the present invention constructed as mentioned above, the gain inversely proportional to the frequency of torsional oscillation of the moving plate is applied to the detecting signal proportional to the frequency, and thereby the oscillating amplitude of the torsional oscillation of the moving plate without undergoing the influence of a change in the driving frequency of the optical scanner. Consequently, the amplitude control can be attained with a high degree of accuracy.

In order to achieve the above object, the driving circuit for an optical scanner according to the present invention is such that the oscillating frequency control device is a resonant frequency follow-up control device for torsion-oscillating the moving plate at the mechanical resonant frequency in accordance with the detecting signal.

According to the present invention constructed as mentioned above, the optical scanner can be torsion-oscillated at the mechanical resonant frequency, and it becomes possible to make the detection of the oscillating amplitude which is not affected by the fluctuation of the mechanical resonant frequency of the optical scanner. Consequently, the amplitude control can be attained with a high degree of accuracy.

Further, in order to achieve the above object, the driving circuit for an optical scanner according to the present invention is such that the gain circuit is constructed with a first-order low-pass filter which has a cut-off frequency much lower than the frequency of torsional oscillation of the moving plate.

According to the present invention constructed mentioned above, the gain inversely proportional to the frequency of torsional oscillation of the moving plate is applied to the detecting signal proportional to the frequency, and gain in a low frequency band can be suppressed. The amplitude control can thus be attained with stability.

Still further, in order to achieve the above object, the driving circuit for an optical scanner according to the present invention is such that the gain circuit is constructed with a first-order band-pass filter which has a cut-off frequency much lower than the frequency of torsional oscillation of the moving plate.

According to the present invention constructed mentioned above, the gain inversely proportional to the frequency of torsional oscillation of the moving plate is applied to the detecting signal proportional to the frequency, and a noise in the low frequency band can be reduced. The amplitude control can thus be attained with a high degree of accuracy.

In order to achieve the second object, the driving circuit for an optical scanner according to the present invention includes a support to be fixed to an arbitrary member; a moving plate, at least one surface of which reflects light; elastic members connecting the support and the moving plate; a pair of magnets arranged close to the moving plate at preset distances; a driving coil provided on the moving plate; and a sensor coil provided on almost the same plane as the driving coil of the moving plate. In this case, the driving circuit has a current supplying device for supplying a current containing at least an alternating-current component to the driving coil; a detecting device for detecting an induced electromotive force generated in the sensor coil; a mutual induction electromotive force generating device for falsely generating a mutual induction electromotive force caused in the sensor coil, independent of the driving coil and the sensor coil, by the current containing at least an alternating-current component which flows through the driving coil; a subtraction device for subtracting the output of the mutual induction electromotive force generating device from the output of the detecting device; and a control device for controlling the torsional oscillation of the moving plate in accordance with the output of the subtraction device.

According to the present invention constructed as mentioned above, the mutual induction electromotive force caused in the sensor coil is falsely generated, independent of the driving coil and the sensor coil, and the torsional oscillation of the moving plate is controlled in accordance with the result that the mutual induction electromotive force falsely generated is subtracted from the induced electromotive force caused in the sensor coil.

In order to achieve the above object, the driving circuit for an optical scanner according to the present invention includes a support to be fixed to an arbitrary member; a moving plate, at least one surface of which reflects light; an elastic member connecting the support and the moving plate; a magnet connected through the elastic member to the moving plate; a driving coil provided to the support; and a sensor coil provided to the support. In this case, the driving circuit has a current supplying device for supplying a current containing at least an alternating-current component to the driving coil; a detecting device for detecting an induced electromotive force generated in the sensor coil; a mutual induction electromotive force generating device for falsely generating a mutual induction electromotive force caused in the sensor coil, independent of the driving coil and the sensor coil, by the current containing at least an alternating-current component which flows through the driving coil; a subtraction device for subtraction-processing the output of the mutual induction electromotive force generating device from the detecting device; and a control device for controlling the torsional oscillation of the moving plate in accordance with the output of the subtraction device.

According to the present invention constructed as described above, the mutual induction electromotive force caused in the sensor coil is falsely generated, independent of the driving coil and the sensor coil, and the torsional oscillation of the moving plate is controlled in accordance with the result that the mutual induction electromotive force falsely generated is subtracted from the induced electromotive force caused in the sensor coil.

Further, in order to achieve the above object, the driving circuit for an optical scanner according to the present invention is such that the mutual induction electromotive force generating device has a first coil and a second coil which are provided on a fixed substrate; a second current supplying device for supplying a current containing at least an alternating-current component to the first coil; and a second detecting device for detecting an induced electromotive force generated in the second coil. The subtraction device subtraction-processes the output of the detecting device and the output of the second detecting device.

According to the present invention constructed as describe above, the mutual induction electromotive force caused in the sensor coil is falsely generated, independent of the driving coil and the sensor coil, by the first and second coils, the second current supplying device, and the second detecting device, and the torsional oscillation of the moving plate is controlled in accordance with the result that the mutual induction electromotive force falsely generated is subtracted from the induced electromotive force caused in the sensor coil.

Still further, in order to achieve the above object, the driving circuit for an optical scanner according to the present invention is such that the mutual induction electromotive force generating device has a first coil and a second coil which are provided on the substrate; a second current supplying device for supplying a current containing at least an alternating-current component to the first coil; and a second detecting device for detecting an induced electromotive force generated in the second coil. The subtraction device subtraction-processes the output of the detecting device and the output of the second detecting device.

According to the present invention constructed as describe above, the mutual induction electromotive force caused in the sensor coil is falsely generated, independent of the driving coil and the sensor coil, by the first and second coils, the second current supplying device, and the second detecting device, and the torsional oscillation of the moving plate is controlled in accordance with the result that the mutual induction electromotive force falsely generated is subtracted from the induced electromotive force caused in the sensor coil.

In the driving circuit for an optical scanner according to the present invention, it is desirable that the mutual inductance caused by the driving coil and the sensor coil is practically equalized to the mutual inductance by the first coil and the second coil.

In doing so, a mutual induction electromotive force which is nearly equal to the mutual induction electromotive force generated in the sensor coil is generated by the first and second coils, the second current supplying device, and the second detecting device, and the torsional oscillation of the moving plate is controlled in accordance with the result that the mutual induction electromotive force generated by the first and second coils, the second current supplying device, and the second detecting device is subtracted from the induced electromotive force generated in the sensor coil.

In the driving circuit for an optical scanner according to the present invention, it is desirable that the first coil is configured into nearly the same structure and shape as the driving coil, the second coil is configured into nearly the same structure and shape as the sensor coil, the second current supplying device is constructed similar to the current supplying device, and the second detecting device is constructed similar to the detecting device.

By doing so, a mutual induction electromotive force which is nearly equal to the mutual induction electromotive force generated in the sensor coil is generated by the first and second coils, the second current supplying device, and the second detecting device, and the torsional oscillation of the moving plate is controlled in accordance with the result that the mutual induction electromotive force generated by the first and second coils, the second current supplying device, and the second detecting device is subtracted from the induced electromotive force generated in the sensor coil.

Further, in order to achieve the above object, the driving circuit for an optical scanner according to the present invention has a first gain circuit increasing or decreasing a current to be supplied through the second current supplying device and a second gain circuit increasing or decreasing an output with the second detecting device.

According to the present invention constructed as mentioned above, a mutual induction electromotive force which is nearly equal to the mutual induction electromotive force generated in the sensor coil is generated by the first and second coils, the second current supplying device, the second detecting device, and the first and second gain circuits, and the torsional oscillation of the moving plate is controlled in accordance with the result that the mutual induction electromotive force generated by the first and second coils, the second current supplying device, the second detecting device, and the first and second gain circuits is subtracted from the induced electromotive force generated in the sensor coil.

Still further, in order to achieve the above object, the driving circuit for an optical scanner according to the present invention is such that the mutual induction electromotive force generating device falsely generates the mutual induction electromotive force caused in the sensor coil, independent of the driving coil and the sensor coil, in accordance with the current supplied to the driving coil.

According to the present invention constructed as mentioned above, the mutual induction electromotive force caused in the sensor coil is falsely generated, independent of the driving coil and the sensor coil, in accordance with the current supplied to the driving coil, and the torsional oscillation of the moving plate is controlled in accordance with the result that the mutual induction electromotive force falsely generated is subtracted from the induced electromotive force caused in the sensor coil.

In the driving circuit for an optical scanner according to the present invention, it is favorable that the mutual induction electromotive force generating device has a phase shifting device for shifting the phase of a signal produced in accordance with the current supplied to the driving coil and a variable gain device for increasing or decreasing the signal produced in accordance with the current supplied to the driving coil.

In doing so, by the mutual induction electromotive force generating device having the phase shifting device for shifting the phase of the signal produced in accordance with the current supplied to the driving coil and the variable gain device for increasing or decreasing the signal produced in accordance with the current supplied to the driving coil, the mutual induction electromotive force caused in the sensor coil is falsely generated, independent of the driving coil and the sensor coil, and the torsional oscillation of the moving plate is controlled in accordance with the result that the mutual induction electromotive force falsely generated is subtracted from the induced electromotive force caused in the sensor coil.

It is favorable that the driving circuit for an optical scanner according to the present invention is provided with at least one of an amplitude control device for continuously controlling the amplitude of the torsional oscillation of the moving plate in accordance with the result of the subtraction device and a frequency control device for continuously controlling the frequency of the torsional oscillation of the moving plate.

By doing so, at least one of the amplitude and frequency of the torsional oscillation of the moving plate is controlled by the control device.

Subsequently, in order to achieve the third object, the driving circuit for an optical scanner according to the present invention includes a support to be fixed to an arbitrary member; a moving plate, at least one surface of which reflects light; elastic members connecting the support and the moving plate; magnets arranged close to the moving plate at preset distances; a driving coil provided on the moving plate; and a sensor coil provided on almost the same plane as the driving coil of the moving plate. In this case, the driving circuit has an oscillation driving device for supplying a current containing at least an alternating-current component to the driving coil to execute a torsional oscillation of the moving plate within a preset angle; an oscillation detecting device for detecting the induced electromotive force generated in the sensor coil, provided with an electromotive force detecting device for outputting a detecting signal corresponding thereto; an oscillating frequency control device for controlling the frequency of the torsional oscillation; a first oscillating amplitude control device for controlling the amplitude of the torsional oscillation in accordance with the detecting signal output by the oscillation detecting device; and a second oscillating amplitude control device for controlling an oscillating condition with each of frequency components except for that of the torsional oscillation in accordance with the detecting signal output by the oscillation detecting device.

According to the present invention constructed as described above, the magnets are arranged in the proximity of the moving plate at preset distances, and the current containing at least an alternating-current component is supplied to the driving coil provided on the moving plate. In this way, a force can be generated in the driving coil provided on the moving plate, and thereby the moving plate can be torsion-oscillated. The oscillation detecting device is capable of detecting the oscillating condition of the moving plate when the electromotive force detecting device detects the induced electromotive force generated in the sensor coil provided on the moving plate. The oscillating frequency control device controls the frequency for torsion-oscillating the moving plate. The oscillation detecting device detects the oscillating condition thereof, and in accordance with this detecting signal, the first oscillating amplitude control device is capable of controlling the amplitude of the torsional oscillation. In accordance with the detecting signal, the second oscillating amplitude control device is capable of controlling the oscillating condition with each of frequency components except for that of the torsional oscillation of the moving plate.

In order to achieve the above object, the driving circuit for an optical scanner according to the present invention includes a support to be fixed to an arbitrary member; a moving plate, at least one surface of which reflects light; an elastic member connecting the support and the moving plate; a magnet connected through the elastic member to the moving plate; a driving coil provided to the support; and a sensor coil provided to the support. In this case, the driving circuit has an oscillation driving device for supplying a current containing at least an alternating-current component to the driving coil to execute a torsional oscillation of the moving plate within a preset angle; an oscillation detecting device for detecting the induced electromotive force generated in the sensor coil, provided with an electromotive force detecting device for outputting a detecting signal corresponding thereto; an oscillating frequency control device for controlling the frequency of the torsional oscillation; a first oscillating amplitude control device for controlling the amplitude of the torsional oscillation in accordance with the detecting signal output by the oscillation detecting device; and a second oscillating amplitude control device for controlling an oscillating condition with each of frequency components except for that of the torsional oscillation in accordance with the detecting signal output by the oscillation detecting device.

According to the present invention constructed as mentioned above, the current containing at least an alternating-current component is supplied to the driving coil provided to the support. In this way, forces can be generated in the magnet connected through the elastic member to the moving plate, and thereby the moving plate can be torsion-oscillated. The oscillation detecting device is capable of detecting the oscillating condition of the moving plate when the electromotive force detecting device detects the induced electromotive force generated in the sensor coil provided to the support.

In the present invention, it is desirable that the second oscillating amplitude control device has a low-pass filter for extracting a frequency component lower than the frequency of the torsional oscillation from the detecting signal and a low-frequency oscillation eliminating device for controlling the oscillating condition of the moving plate so that its output becomes zero.

When the present invention is constructed as described above, the low-pass filter extracts an oscillating motion with a lower frequency than in the torsional oscillation of the moving plate, and the low-frequency oscillation eliminating device makes control so that the output of the low-pass filter becomes zero. Consequently, the oscillating motion with a lower frequency than in the torsional oscillation of the moving plate can be eliminated.

In the present invention, it is desirable that the oscillating frequency control device is provided with a resonant frequency follow-up control device for executing the torsional oscillation of the moving plate at the mechanical resonant frequency in accordance with the detecting signal.

By doing so, the moving plate can be continuously torsion-oscillated at the mechanical resonant frequency.

Subsequently, in order to achieve the fourth object, the driving circuit for an optical scanner according to the present invention includes a support to be fixed to an arbitrary member; a moving plate, at least one surface of which reflects light; elastic members connecting the support and the moving plate; magnets arranged close to the moving plate at preset distances; a driving coil provided on the moving plate; and a sensor coil provided on the moving plate. In this case, the driving circuit has an oscillation driving device for supplying a current containing at least an alternating-current component to the driving coil to execute the torsional oscillation of the moving plate within a preset angle; an oscillation detecting device for detecting the oscillating condition of the moving plate in accordance with the induced electromotive force generated in the sensor coil; an amplitude control device for controlling the amplitude of the oscillation of the moving plate in accordance with the output of the oscillation detecting device; and a frequency control device for controlling the oscillating frequency of the moving plate. The oscillation detecting device has a constant-voltage source connected in series to the sensor coil; a voltage detecting device for detecting voltages created at both terminals of a series circuit comprised of the sensor coil and the constant-voltage source to output signals corresponding thereto; a constant-voltage eliminating device for outputting a signal in which a constant-voltage component is eliminated from the output of the voltage detecting device; and a constant-voltage extracting device for extracting the constant-voltage component from the output of the voltage detecting device to output a signal corresponding thereto.

According to the present invention constructed as described above, in the oscillation driving device, the magnets are arranged in the proximity of the moving plate at preset distances, and the current containing at least an alternating-current component is supplied to the driving coil provided on the moving plate. In this way, a force can be generated in the driving coil provide on the moving plate, and thereby the moving plate is torsion-oscillated. The oscillation detecting device detects the oscillating condition of the moving plate when the electromotive force detecting device detects the induced electromotive force generated in the sensor coil provided on the moving plate. The amplitude control device controls the oscillating amplitude of the moving plate in accordance with the output of the oscillation detecting device. The frequency control device controls the oscillating frequency of the moving plate. In the oscillation detecting device, the voltage detecting device detects the voltages at both terminals of the series circuit comprised of the sensor coil and the constant-voltage source to produce the signal in which the constant-voltage component is eliminated from the result of the detection. Moreover, in the oscillation detecting device, the constant-voltage component is extracted from the output of the voltage detecting device. Since the constant-voltage component obtained here is to indicate the resistance value of the sensor coil, it is possible to know the influence of the fluctuation of the resistance value of the sensor coil on the oscillating condition of the optical scanner.

Further, in order to achieve the above object, the driving circuit for an optical scanner includes a support to be fixed to an arbitrary member; a moving plate, at least one surface of which reflects light; an elastic member connecting the support and the moving plate; a magnet connected through the elastic member to the moving plate; a driving coil provided to the support; and a sensor coil provided to the support. In this case, the driving circuit has an oscillation driving device for supplying a current containing at least an alternating-current component to the driving coil to execute a torsional oscillation of the moving plate within a preset angle; an oscillation detecting device for detecting the oscillating condition of the moving plate in accordance with the induced electromotive force generated in the sensor coil; an amplitude control device for controlling the amplitude of the oscillation of the moving plate in accordance with the output of the oscillation detecting device; and a frequency control device for controlling the oscillating frequency of the moving plate. The oscillation detecting device has a constant-voltage source connected in series to the sensor coil; a voltage detecting device for detecting voltages created at both terminals of a series circuit comprised of the sensor coil and the constant-voltage source to output signals corresponding thereto; a constant-voltage eliminating device for outputting a signal in which a constant-voltage component is eliminated from the output of the voltage detecting device; and a constant-voltage extracting device for extracting the constant-voltage component from the output of the voltage detecting device to output a signal corresponding thereto.

According to the present invention constructed as mentioned above, the oscillation driving device is such that the current containing at least an alternating-current component is supplied to the driving coil provided to the support to thereby generate the forces in the magnet connected through the elastic member to the moving plate. Consequently, the moving plate is torsion-oscillated. In the oscillation detecting device, the electromotive force detecting device detects the induced electromotive force caused in the sensor coil provided to the support, thereby detecting the oscillating condition of the moving plate. The amplitude control device controls the amplitude of the oscillation of the moving plate in accordance with the output of the oscillation detecting device. The frequency control device controls the oscillating frequency of the moving plate. Further, in the oscillation detecting device, the voltage detecting device detects voltages at both terminals of the series circuit composed of the sensor coil and the constant-voltage source to produce the signal in which the constant-voltage component is eliminated from the result of the detection. Still further, in the oscillation detecting device, the constant-voltage component is extracted from the output of the voltage detecting device. Since the constant-voltage component obtained here is to indicate the resistance value of the sensor coil, it is possible to know the influence of the fluctuation of the resistance value of the sensor coil on the oscillating condition of the optical scanner.

Still further, in order to achieve the above object, the driving circuit for an optical scanner according to the present invention, in addition to the above construction of the driving circuit for an optical scanner, is such that the oscillation detecting device is provided with a division device for dividing the output of the constant-voltage eliminating device by the output of the constant-voltage extracting device.

According to the present invention constructed as mentioned above, "the signal in which the constant-voltage component is eliminated" obtained by the oscillation detecting device can be divided by "the constant-voltage component" obtained by the oscillation detecting device. Consequently, the oscillating condition of the optical scanner can be found in which the influence of the fluctuation of the resistance value of the sensor coil is excluded.

These and other objects as well as the features and advantages of the present invention will become apparent from the following description of the preferred embodiments when taken in conjunction with the accompanying drawings.

BRIEF DESCRIPTION OF THE DRAWINGS

FIG. 1 is a schematic view for illustrating an operating principle of the optical scanner;

FIG. 7 is a view for illustrating a state where the driving signal is delivered to the driving coil of the optical scanner in FIG. 3;

DETAILED DESCRIPTION OF THE PREFERRED EMBODIMENTS

The embodiments of the driving circuit for an optical scanner of the present invention will be described below.

First Embodiment

Figure 2A:
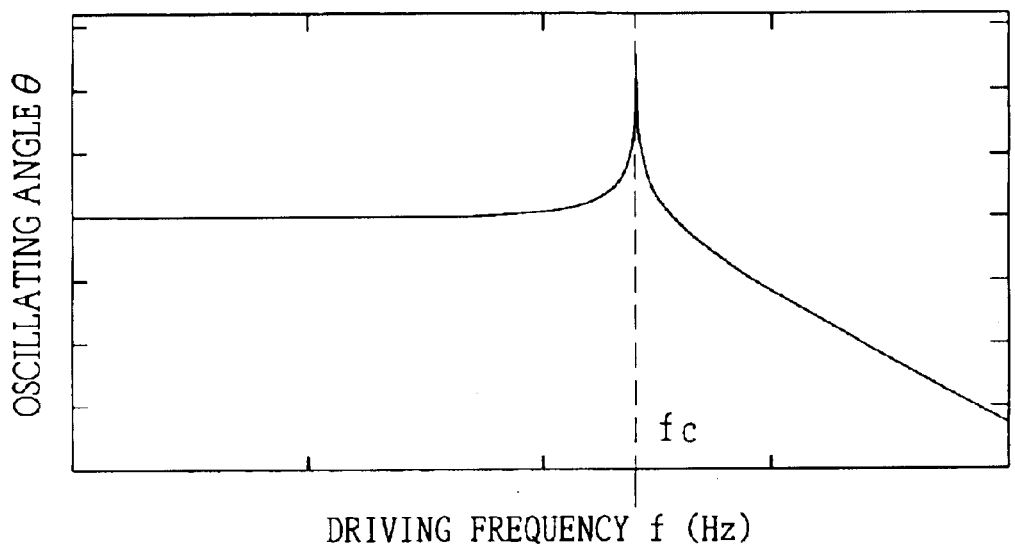
FIG. 2A is a graph showing characteristics of the oscillating angle relative to the oscillating frequency of the optical scanner.
Figure 2B:
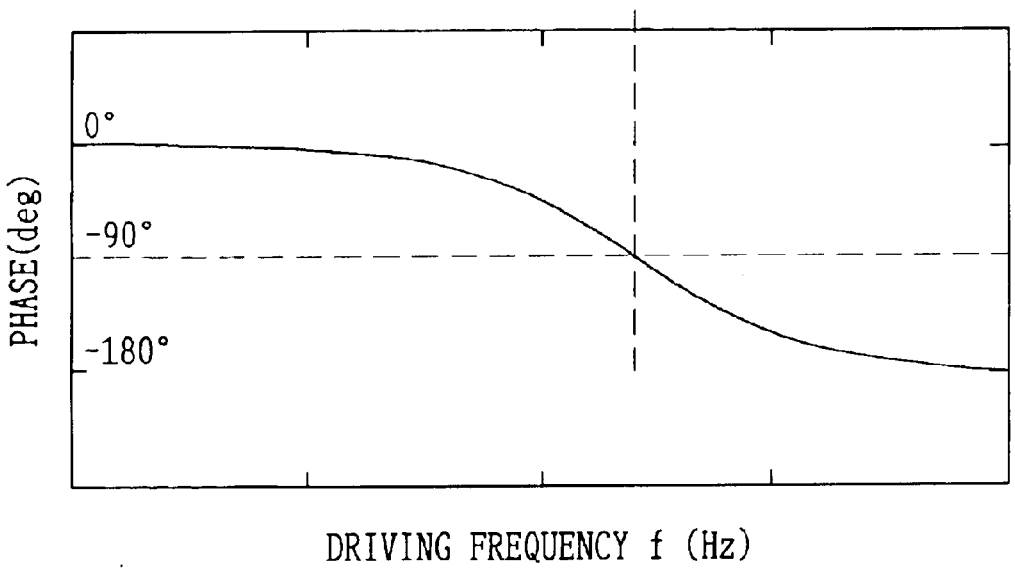
FIG. 2B is a graph showing characteristics of the phase relative to the oscillating frequency of the optical scanner.
Figure 3:
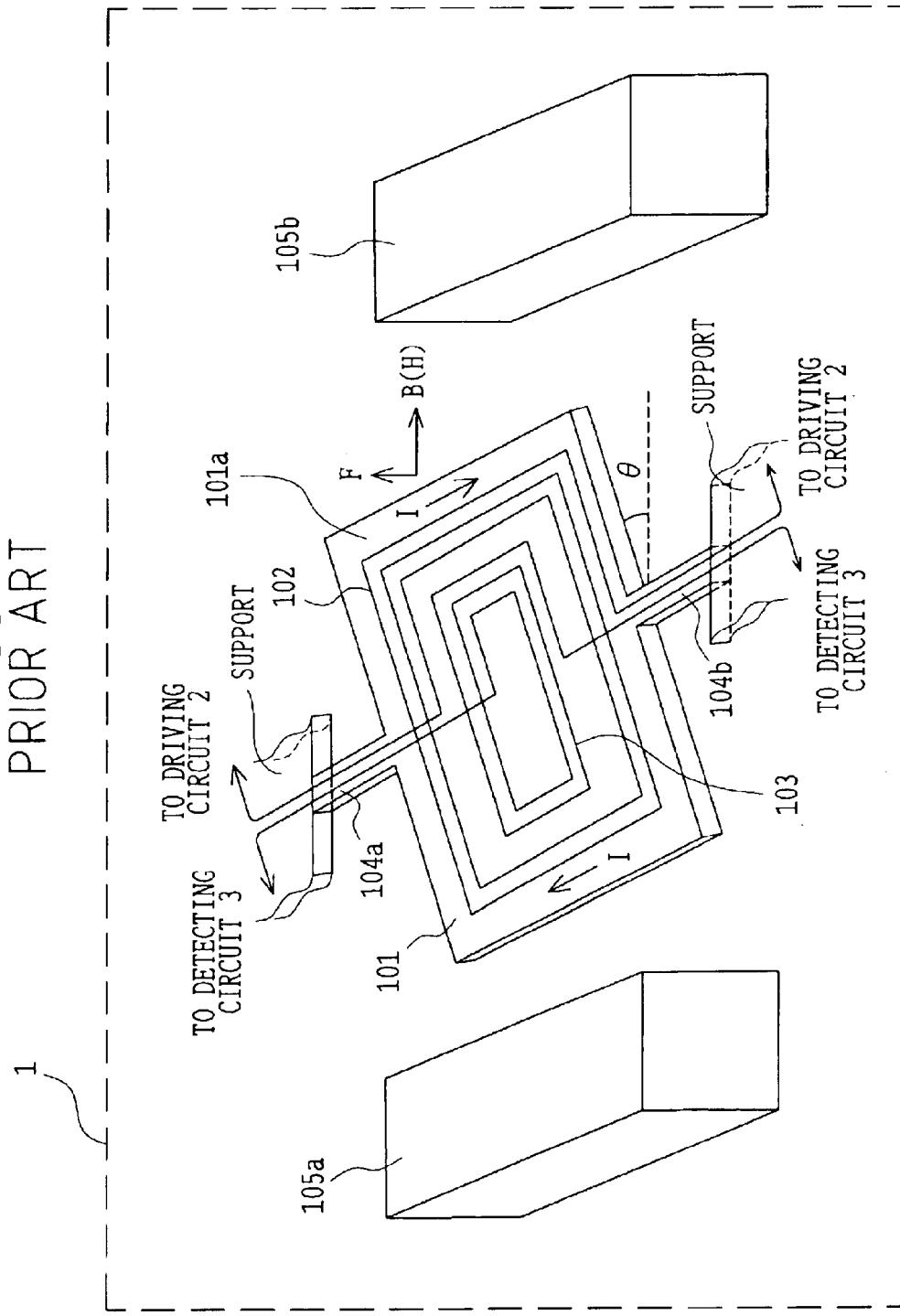
FIG. 3 is a view showing a schematic structure of the optical scanner to which the driving circuit of the present invention is applied.
Figure 4A:
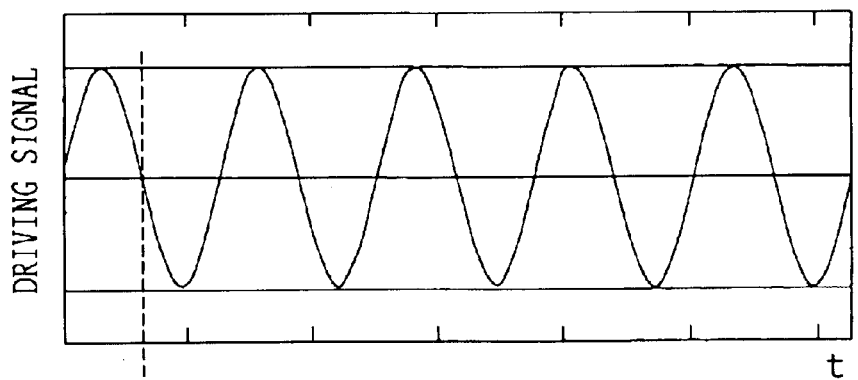
FIG. 4A is a diagram showing the waveform of a driving signal in a resonant frequency drive.
Figure 4B:
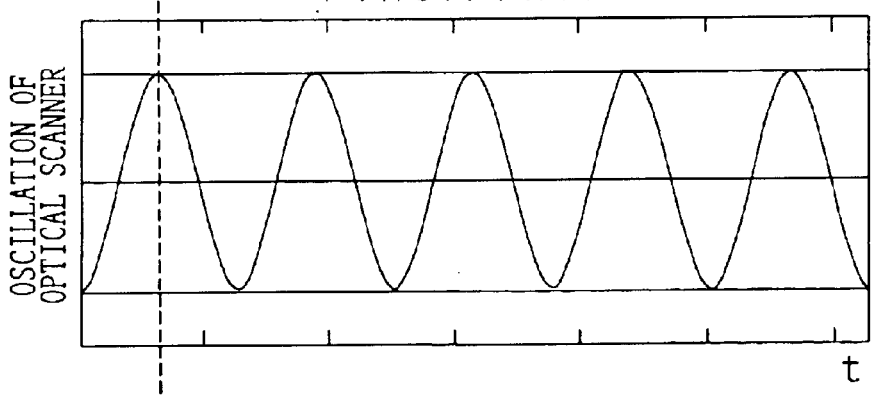
FIG. 4B is a diagram showing the oscillating waveform of the optical scanner in the resonant frequency drive.
Figure 4C:
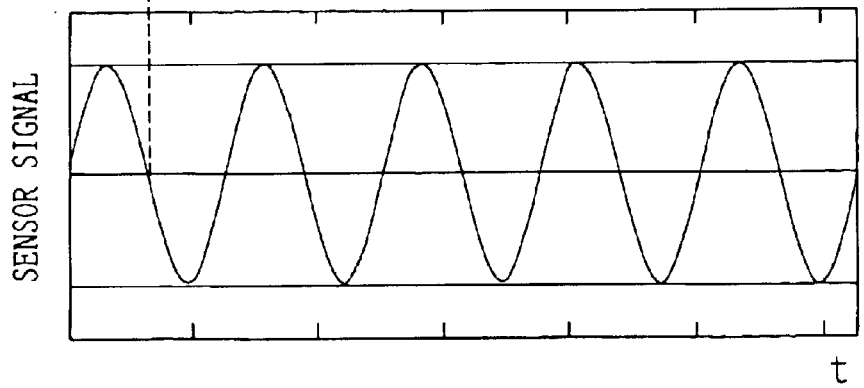
FIG. 4C is a diagram showing the oscillating waveform of a sensor signal (the electromotive force of a sensor coil) in the resonant frequency drive.

The optical scanner 1 to which the driving circuit of the present invention is applied, as shown in FIG. 3, includes the mirror portion 101 in which the coil pattern (the driving coil 102) and the sensor coil 103 are provided parallel with the mirror face 101a; the spring portions 104a and 104b for oscillating the mirror portion 101; and the permanent magnets 105a and 105b arranged close to the mirror portion 101, for producing the magnetic field nearly parallel with the mirror face 101a where the mirror portion 101 is in a stationary state. The spring portions 104a and 104b are connected to a support, not shown, to be fixed to an arbitrary member. By supplying the alternating current (of the frequency f) to the driving coil 102, a force obeying the left-hand rule is generated in a direction normal to the mirror face 101a to oscillate the mirror portion 101 at the frequency f.

Figure 5:
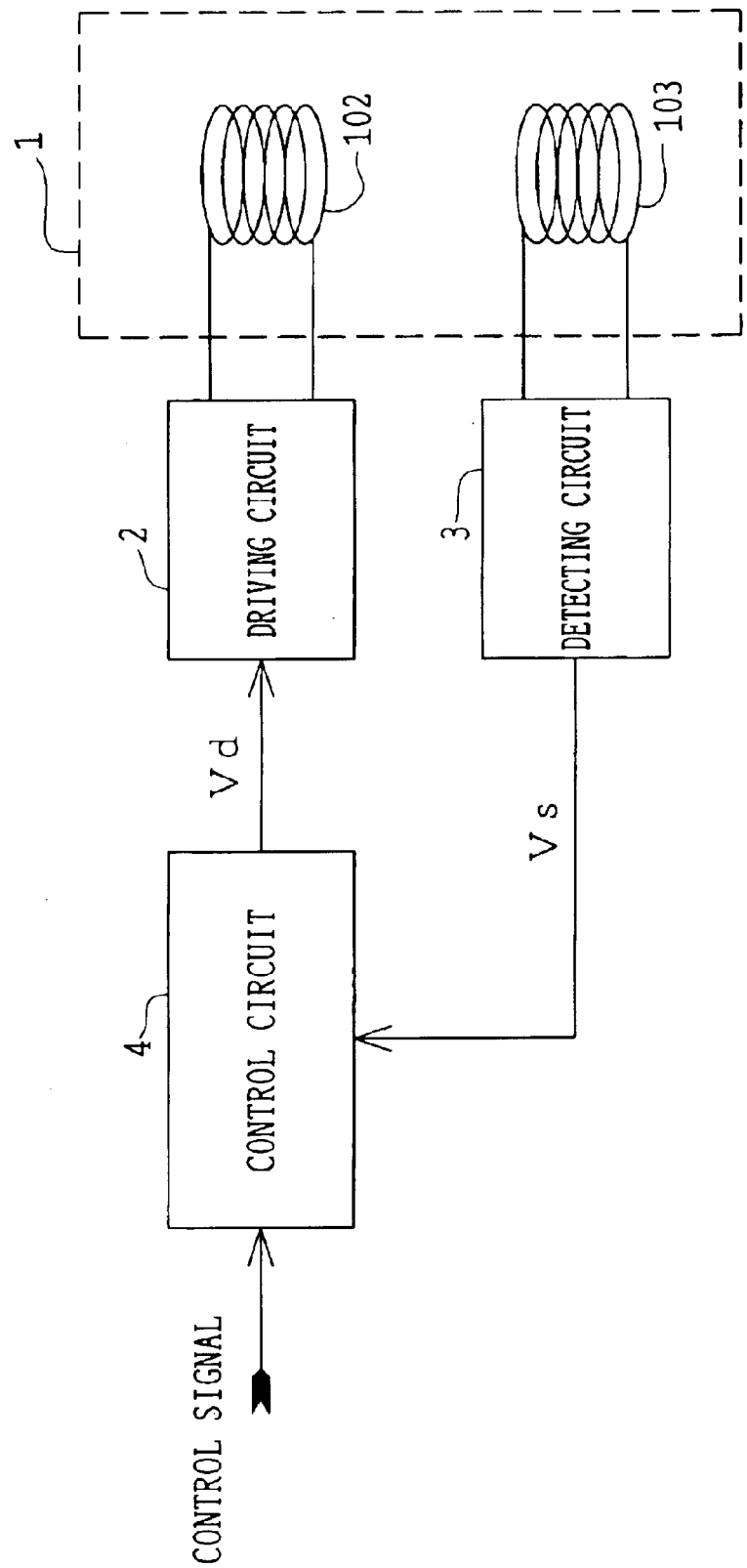
FIG. 5 is a block diagram showing a schematic construction of circuitry for control-driving the optical scanner according to the present invention.

FIG. 5 shows the circuitry for control-driving the optical scanner 1 to which the driving circuit of the present invention is applied. In the circuitry of FIG. 5, from the operating controller such as a PC, not shown, a control signal which commands the desired driving condition of the optical scanner 1, such as the oscillating amplitude (oscillating angle) or oscillating frequency of the optical scanner 1, is supplied to the control circuit 4. The control circuit 4, when receiving the control signal, outputs the driving command signal $V_d$ to the driving circuit 2. The driving circuit 2 outputs the driving signal (the alternating current) to the driving coil 102 in accordance with the driving command signal $V_d$. The optical scanner 1 is thus oscillated at desired oscillating angle and oscillating frequency. In this case, at both ends of the sensor coil 103, the sensor coil 103 is interlinked with the magnetic field produced by the permanent magnets 105a and 105b and thereby the electromotive force (the sensor signal) is generated. This electromotive force (the sensor signal) is feedbacked to the control circuit 4 as the detecting signal $V_s$ detected by the detecting circuit 3. In the control circuit 4, the detecting signal $V_s$ is monitored so that when the oscillating amplitude (the oscillating angle) or oscillating frequency of the optical scanner 1 is out of a desired value, the driving command signal $V_d$ output to the driving circuit 2 is compensated. In this way, the optical scanner 1 can be controlled and driven with stability.

Figure 6:
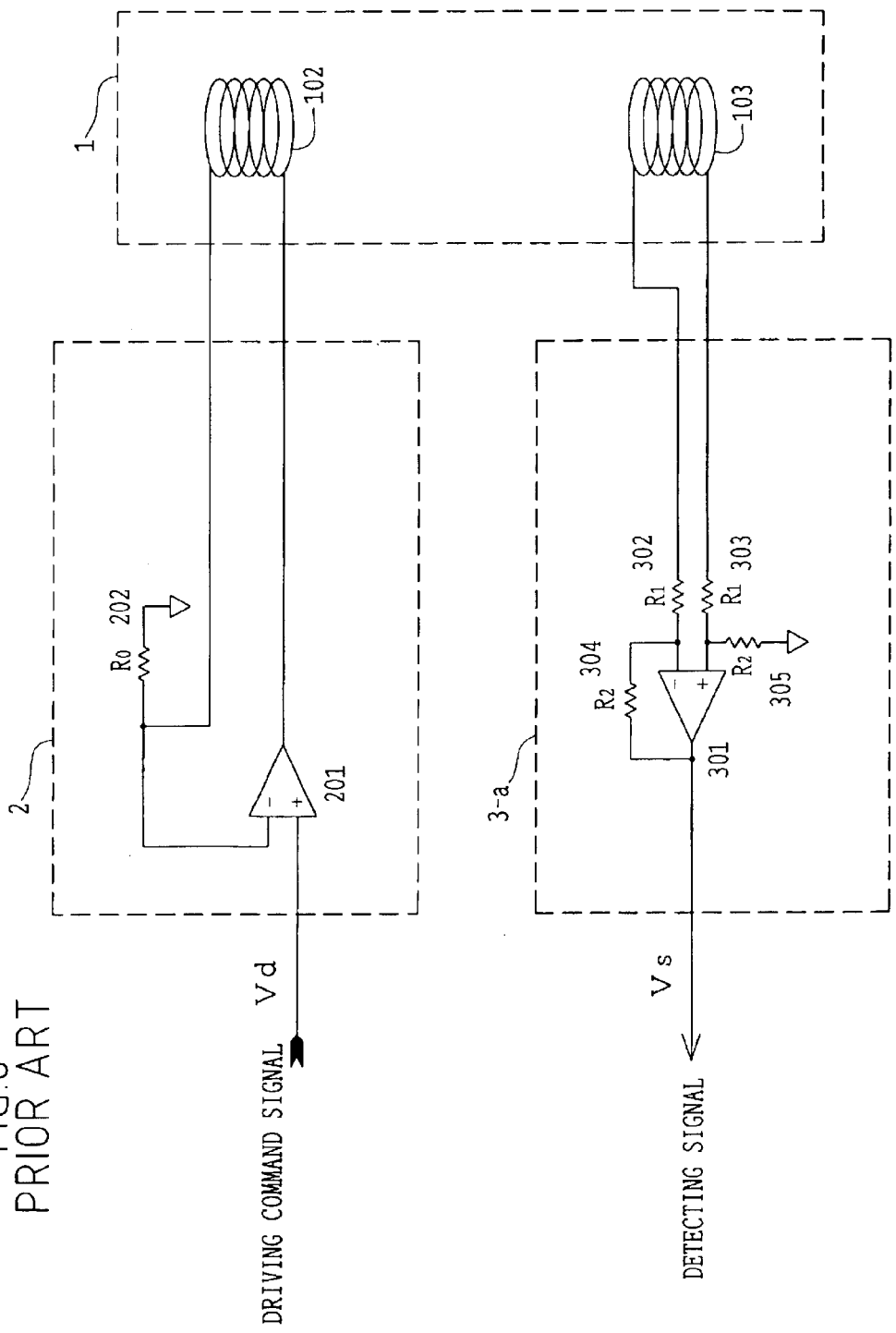
FIG. 6 is a diagram showing an example of the configurations of a driving circuit and a detecting circuit in the circuitry of FIG. 5.
Figure 8A:
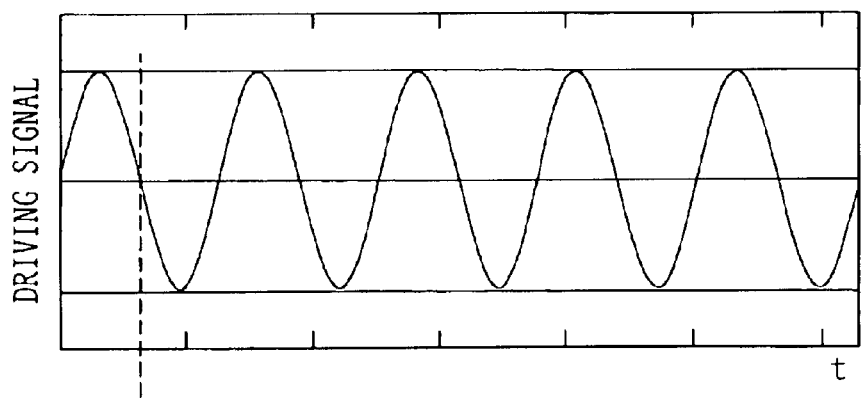
FIG. 8A is a diagram showing the waveform of the driving signal in the resonant frequency drive.
Figure 8B:
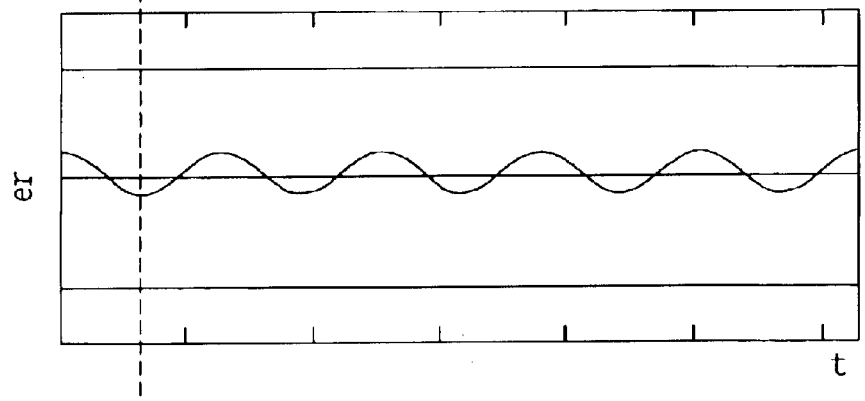
FIG. 8B is a diagram showing the waveform of a mutual induction electromotive force in a resonant frequency drive.
Figure 8C:
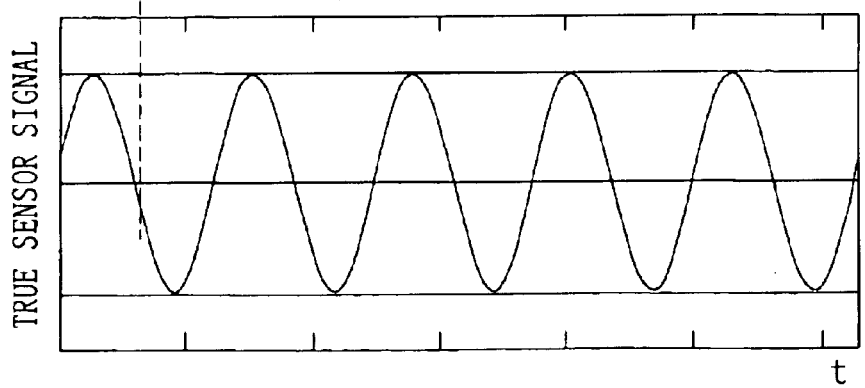
FIG. 8C is a diagram showing the waveform of a true electromotive force (the sensor signal) in a resonant frequency drive.
Figure 12:
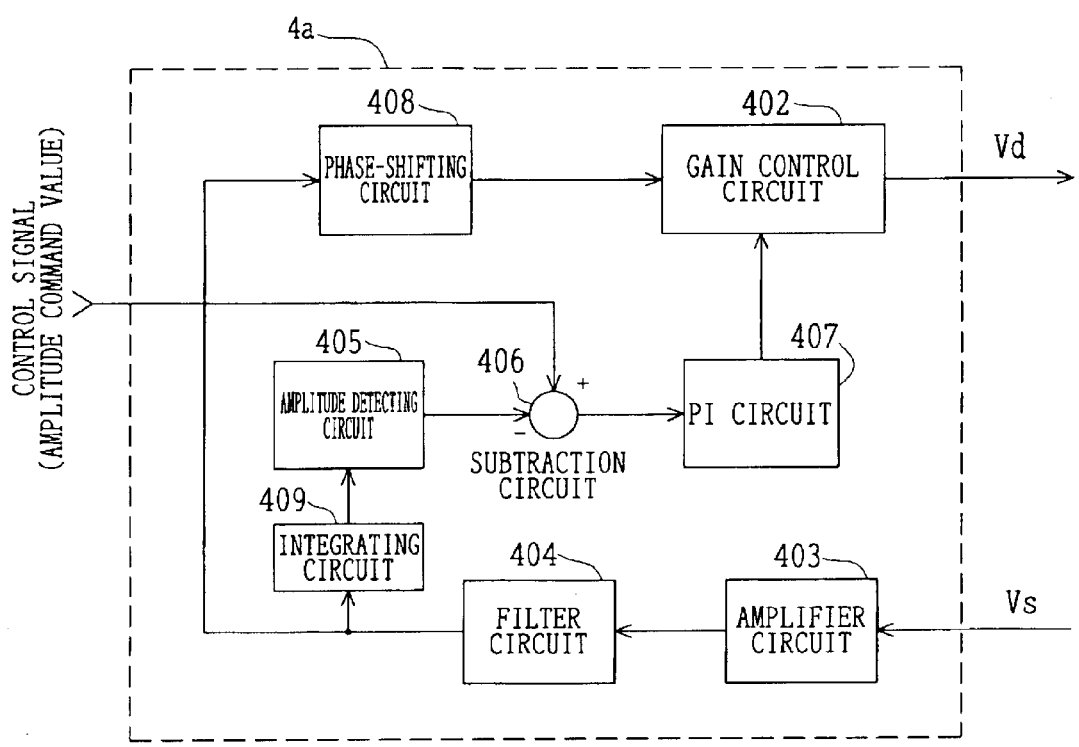
FIG. 12 is a view showing the construction of a control circuit used in a first embodiment of the present invention.

Subsequently, the constructions of the driving circuit 2, the detecting circuit 3-a, and a control circuit 4a, as an example for each, are shown in FIGS. 6 and 12. As shown in FIG. 6, the driving circuit 2 includes the operational amplifier 201 and the resistance element (R0) 202 so that they convert the driving command signal $V_d$ into the driving signal (the alternating current).

Here, when the driving signal supplied to the driving coil 102 is expressed as $I=I_0 \sin(2\pi ft)$, the relation between the driving command signal $V_d$ and the driving signal (the alternating current) is given by the following equation:

$$V_d = R_0 \cdot I = R_0 \cdot I_0 \cdot \sin(2\pi ft) \tag{18}$$

The detecting circuit 3-a includes the operational amplifier 301, the resistance element (R1) 302, the resistance element (R1) 303, the resistance element (R2) 304, and the resistance element (R2) 305 so that they convert the electromotive force (the sensor signal) into the detecting signal $V_s$.

Here, again, when the electromotive force is denoted by $V_r$, the resistance value of the sensor coil is denoted by $R_{sens}$, and the self-inductance and wiring capacity of the sensor coil 103 are assumed to be negligible, the relation between the electromotive force $V_r$ and the detecting signal $V_s$ is given by the following equation:

$$V_s = \frac{-2R_2}{2R_1 + R_{sens}} \cdot V_r \tag{19}$$

FIG. 12 is block diagram showing the first embodiment (the control circuit 4a) of the control circuit 4 which controls the oscillating amplitude and oscillating frequency of the optical scanner 1 in accordance with the detecting signal $V_s$ output from the detecting circuit 3. The great advantage of the present invention lies in the circuit configuration of the control circuit 4.

The control circuit 4a is adapted to construct a positive feedback loop with an amplifier circuit 403, a filter circuit 404, a phase-shifting circuit 408, and a gain control circuit 402, and thereby has a function (a resonant frequency follow-up control function) of oscillating the optical scanner 1 at the mechanical resonant frequency $f_c$.

Furthermore, the control circuit 4a is adapted to construct a negative feedback loop with the amplifier circuit 403, the filter circuit 404, an integrating circuit 409, an amplitude detecting circuit 405, a subtraction circuit 406, a PI circuit 407, and the gain control circuit 402, and thereby has a function (an oscillating amplitude control function) of oscillating the optical scanner 1 at a desired oscillating amplitude (oscillating angle).

The amplifier circuit 403 is designed to increase the amplitude at a preset factor in order to facilitate the control of the signal level (signal amplitude) of the detecting signal $V_s$.

The filter circuit 404 is constructed with a band-pass filter which extracts only the oscillating frequency component (the frequency component indicated by a frequency command value) and plays a role of noise elimination. Also, although it is most desirable that the filter circuit 404 is constructed with the band-pass filter, the same effect is brought about even when a low-pass filter or high-pass filter is used or the filter is not used, depending on the condition of noise.

The phase-shifting circuit 408 is designed to make phase adjustment so that the driving command signal $V_d$ output from the gain control circuit 402 agrees in phase with the detecting signal $V_s$ supplied to the amplifier circuit 403 (because both signals agree in phase with each other in the oscillation at the resonant frequency), and is constructed so that the signal is delivered to gain control circuit 402 by shifting the phase of the output of the filter circuit 404. Also, the amount of phase adjustment made here is governed by the amount of phase shift at each of the amplifier circuit 403, the filter circuit 404, and the gain control circuit 402. The gain control circuit 402 is constructed to control the amplitude of the signal supplied from the phase-shifting circuit 408 in accordance with the control signal output from the PI circuit 407 and to output the driving command signal $V_d$.

The integrating circuit 409 is adapted to apply the gain of the reciprocal of the frequency (k/f, where k is a constant) to the output of the filter circuit 404. Here, it is desirable that the constant k is set to a resonant frequency $f_{co}$ of the optical scanner in the initial condition. (Also, the initial condition refers to a condition where the influence of a change of ambience or a change with age is zero.)

Since in the integrating circuit 409 the gain of the reciprocal of the frequency (k/f, where k is a constant) is applied to the output of the filter circuit 404, the gain is increased unlimitedly in a low-frequency region, notably a DC (zero-frequency) region, and a low-frequency noise, such as a source noise, is increased.

Thus, in the first embodiment, the integrating circuit is constructed to have a gain characteristic of the reciprocal of the frequency (k/f, where k is a constant) only in the frequency band close to the resonant frequency of the optical scanner 1 in the initial condition (at least, the width of shift of the resonant frequency which fluctuates due to a change of ambience or a change with age).

Figure 13:
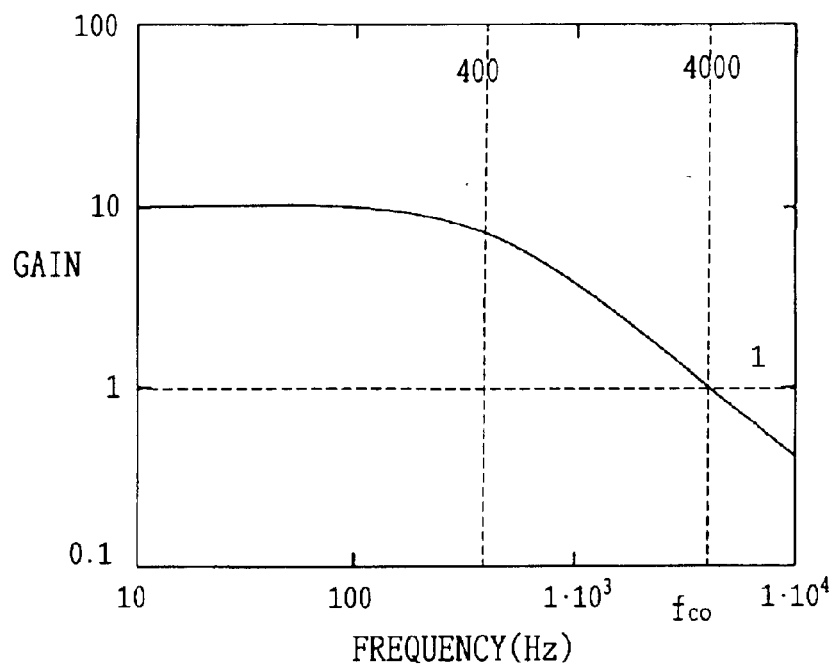
FIG. 13 is a graph showing an example of characteristics of the gain relative to the frequency in an integrating circuit of the control circuit of FIG. 12.
Figure 14:
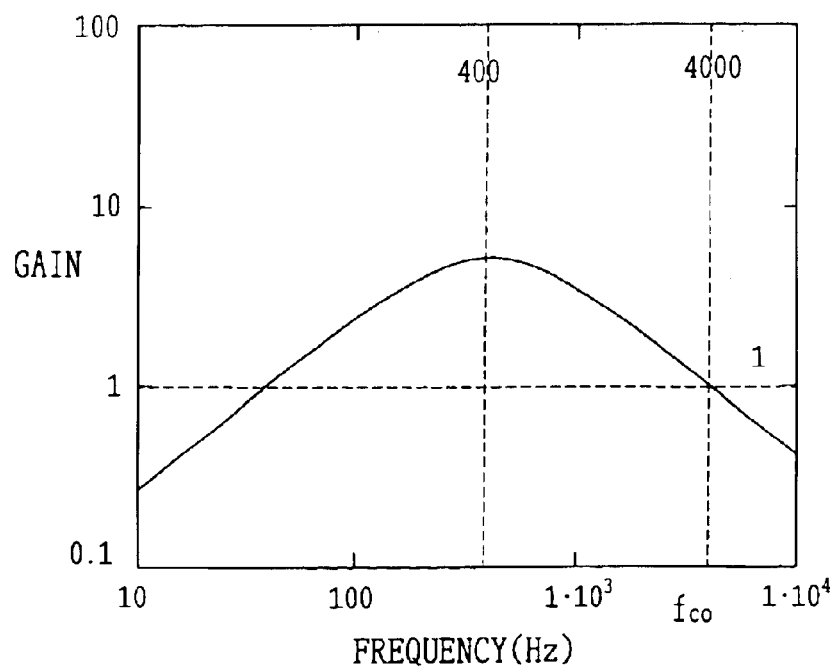
FIG. 14 is a graph showing another example of characteristics of the gain relative to the frequency in an integrating circuit of the control circuit of FIG. 12.

Specifically, when the integrating circuit 409, as shown in FIG. 13, is constructed with a low-pass filter of ×10 gain which has a cutoff frequency (400 Hz) equal to ⅒ of the resonant frequency $f_{co}$ (assumed to be 4000 Hz) of the optical scanner 1 in the initial condition, the gain becomes ×1 at the resonant frequency $f_{co}$ and thus is easy to handle, and the design is facilitated. With such gain characteristics, the gain becomes the reciprocal of the frequency in a band close to the resonant frequency $f_{co}$, and a flat gain characteristic is obtained in the low-frequency region. Therefore, an effect is produced on the above problem. Alternatively, when the integrating circuit 409 is constructed by a combination of the low-pass filter with the characteristics shown in FIG. 13 and a high-pass filter of ×1 gain which has a cutoff frequency 400 Hz as shown in FIG. 14, an effect is brought about on noise elimination in the low-frequency region.

The amplitude detecting circuit 405 is designed to detect an amplitude value (or an RMS value) of the supplied signal so that a resulting detecting signal is output to the subtraction circuit 406. The subtraction circuit 406 is adapted to find a deviation between an amplitude value obtained by the amplitude detecting circuit 405 and an amplitude command value which is the control signal so that a resulting deviation signal is output to the PI circuit 407. The PI circuit 407 has an I circuit (an integrating circuit) an a P circuit (a proportional circuit) so that the deviation signal output from the subtraction circuit 406 is amplified by a preset gain and a resulting control signal is output to the gain control circuit 402.

Subsequently, a description is given of the operation of the control driving circuit of the optical scanner, shown in FIGS. 3, 5, 6, and 12.

In the initial condition where the optical scanner 1 is not oscillated, since the output $V_s$ of the detecting circuit 3 is zero and the amplitude command value of the control signal is supplied to the subtraction circuit 406, the output of the subtraction circuit 406 becomes plus and the control signal produced in the PI circuit 407 is increased (a negative feedback gain becomes at least 1). As a result, the optical scanner 1 starts the oscillation at the resonant frequency, and the gain control circuit 402 is operated to increase the oscillating amplitude of the optical scanner 1 until the output $V_s$ of the detecting circuit 3-*a* agrees with the amplitude command value (until the output of the subtraction circuit 406 becomes zero).

Conversely, where the output $V_s$ of the detecting circuit 3-*a* exceeds the amplitude command value, the gain control circuit 402 is operated to decrease the amplitude of a sine wave (a rectangular wave or pulse wave) signal output from the phase-shifting circuit 408 and to decrease the oscillating amplitude of the optical scanner 1.

In the control circuit 4*a*, the optical scanner can thus be always driven at the resonant frequency and even when the resonant frequency fluctuates, the amplitude can be controlled with a high degree of accuracy.

Also, although the first embodiment brings about an effect where the optical scanner is driven at the resonant frequency, the present invention is also effective where it is driven at an arbitrary frequency (where the resonant frequency follow-up control is not made). Thus, a construction in this case is described as the second embodiment.

Second Embodiment

Figure 15:
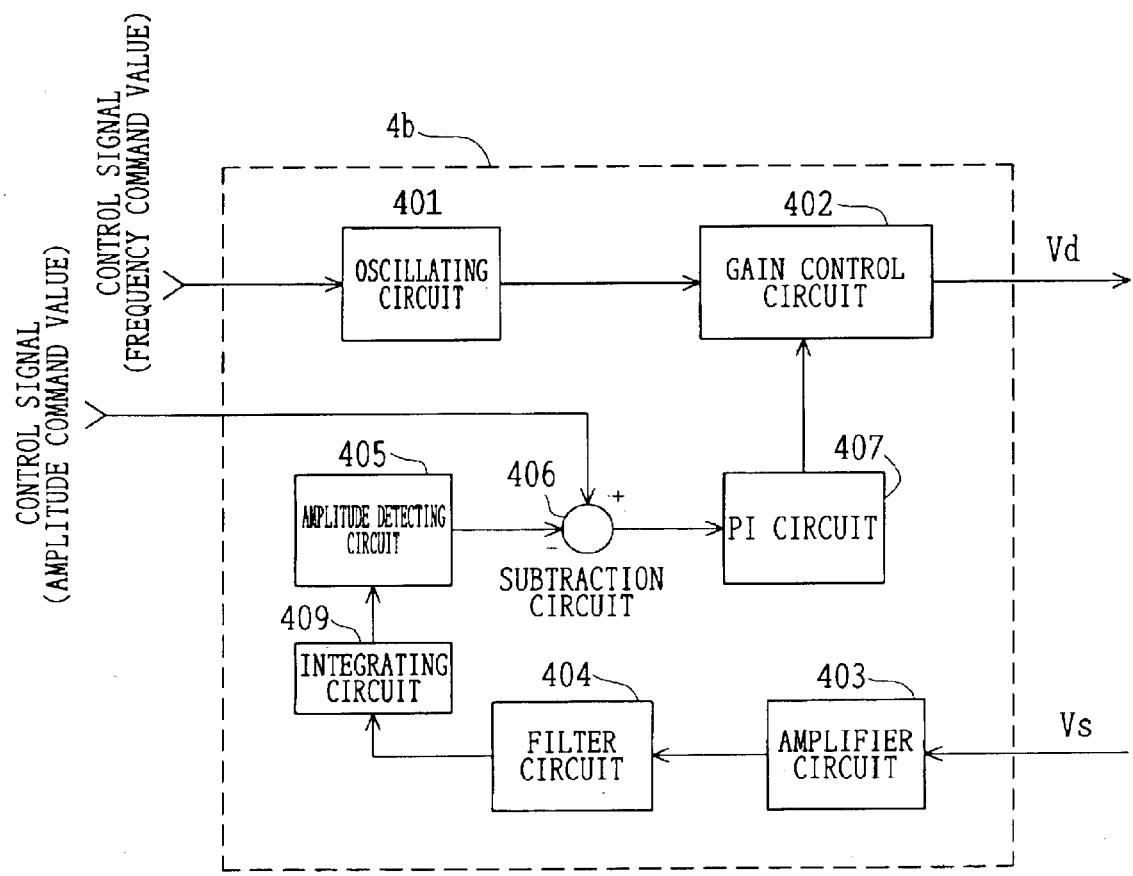
FIG. 15 is a view showing the construction of a control circuit used in a second embodiment of the present invention.

FIG. 15 is a block diagram showing the second embodiment (a control circuit 4*b*) of the control circuit 4 used in the driving circuit for an optical scanner of the present invention.

The control circuit 4*b* of the second embodiment has the same construction as the control circuit 4*a* of the first embodiment with the exception that an oscillating circuit 401 connected to an operating controller, not shown, is provided instead of the phase-shifting circuit 408 connected to the filter circuit 404 in the first embodiment of FIG. 12. In the second embodiment, as shown in FIG. 15, the control signal includes two command values, the frequency command value and the amplitude command value, and the frequency command value is first supplied to the oscillating circuit 401. In the oscillating circuit 401, a sine-wave signal with a preset amplitude at a frequency indicated by the frequency command value, or a rectangular wave (a pulse wave) including a sine-wave component, is produced and is output to the gain control circuit 402. In the gain control circuit 402, the amplitude of the sine-wave signal (or the sine-wave component) output from the oscillating circuit 401 is controlled in accordance with the control signal output from the PI circuit 407, and the driving command signal $V_d$ is output. The construction of the negative feedback loop controlling the amplitude is the same as in the first embodiment, and thus its explanation is omitted.

Also, in the control circuit 4*a* of the first embodiment, as describe above, it is favorable that the integrating circuit 409 is constructed with the filter of the gain characteristic of k/f in the frequency band close to the resonant frequency as shown in FIG. 13 or 14. In the control circuit 4*b* of the second embodiment, however, it is necessary that the integrating circuit 409 is constructed with a filter of the gain characteristic of k/f in the range of the frequency command value (the frequency band).

Here, reference is made to the operation of the control driving circuit of the optical scanner using the control circuit 4*b* constructed as mentioned above.

In the initial condition where the optical scanner is not oscillated, when the frequency command value of the control signal is output, the oscillating circuit 401 outputs the driving command signal. The driving command value output is supplied through the gain control circuit 402 to the driving circuit 2. In the initial condition, since the output $V_s$ of the detecting circuit 3 is zero and the amplitude command value of the control signal is supplied to the subtraction circuit 406, the output of the subtraction circuit 406 becomes plus and the control signal produced in the PI circuit 407 is increased (a negative feedback gain becomes at least 1). As a result, the optical scanner 1 starts the oscillation at a frequency indicated by the frequency command value, and the gain control circuit 402 is operated to increase the oscillating amplitude of the optical scanner 1 until the output $V_s$ of the detecting circuit 3 agrees with the amplitude command value (until the output of the subtraction circuit 406 becomes zero).

Conversely, where the output $V_s$ of the detecting circuit 3 exceeds the amplitude command value, the gain control circuit 402 is operated to decrease the amplitude of a sine wave (a rectangular wave or pulse wave) signal output from the oscillating circuit 401 and to decrease the oscillating amplitude of the optical scanner 1.

In the control circuit 4*b*, the optical scanner can thus be driven at an arbitrary frequency and the amplitude can be controlled with a high degree of accuracy.

According to the present invention, as will be obvious from the above description, the influence of a change of the driving frequency on the optical scanner can be eliminated, and high-precision amplitude control becomes possible. As a result, the driving circuit for an optical scanner in which an optical scan with permanent stability is possible can be provided.

Third Embodiment

Figure 16:
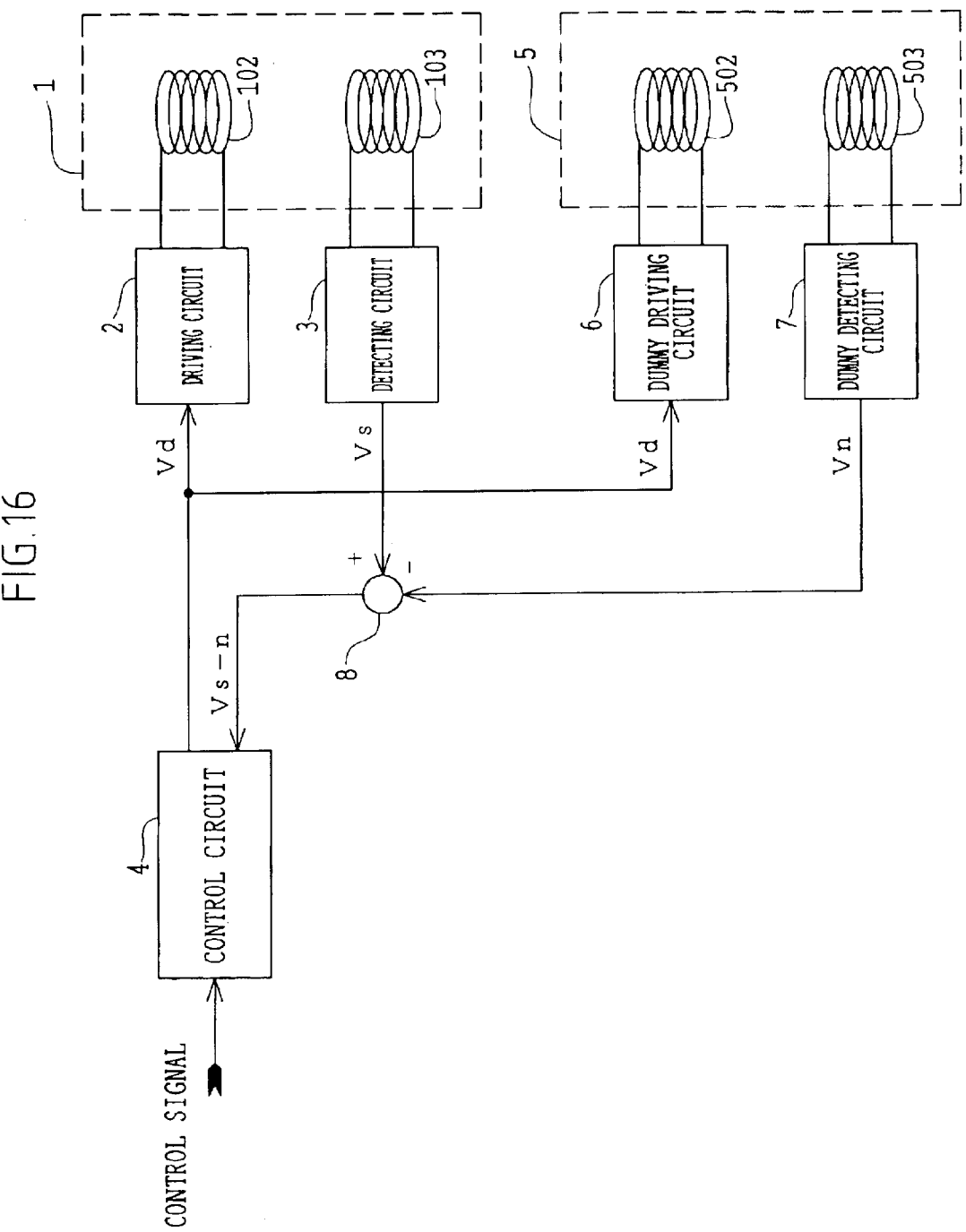
FIG. 16 is a block diagram showing a schematic construction of a third embodiment of the present invention.

FIG. 16 shows a schematic construction of the third embodiment in the driving circuit for an optical scanner according to the present invention.

In addition to the construction of the driving circuit for an optical scanner shown in FIG. 5, the driving circuit for an optical scanner of the third embodiment has a dummy driving circuit 6 driving a dummy scanner 5, a dummy detecting circuit 7 detecting the driving condition of the dummy scanner 5, and a subtraction circuit 8.

The optical scanner 1, the driving circuit 2, and the detecting circuit 3 are constructed to be almost identical with those described with reference to FIGS. 2A, 2B, 4A, and 4B.

Figure 17:
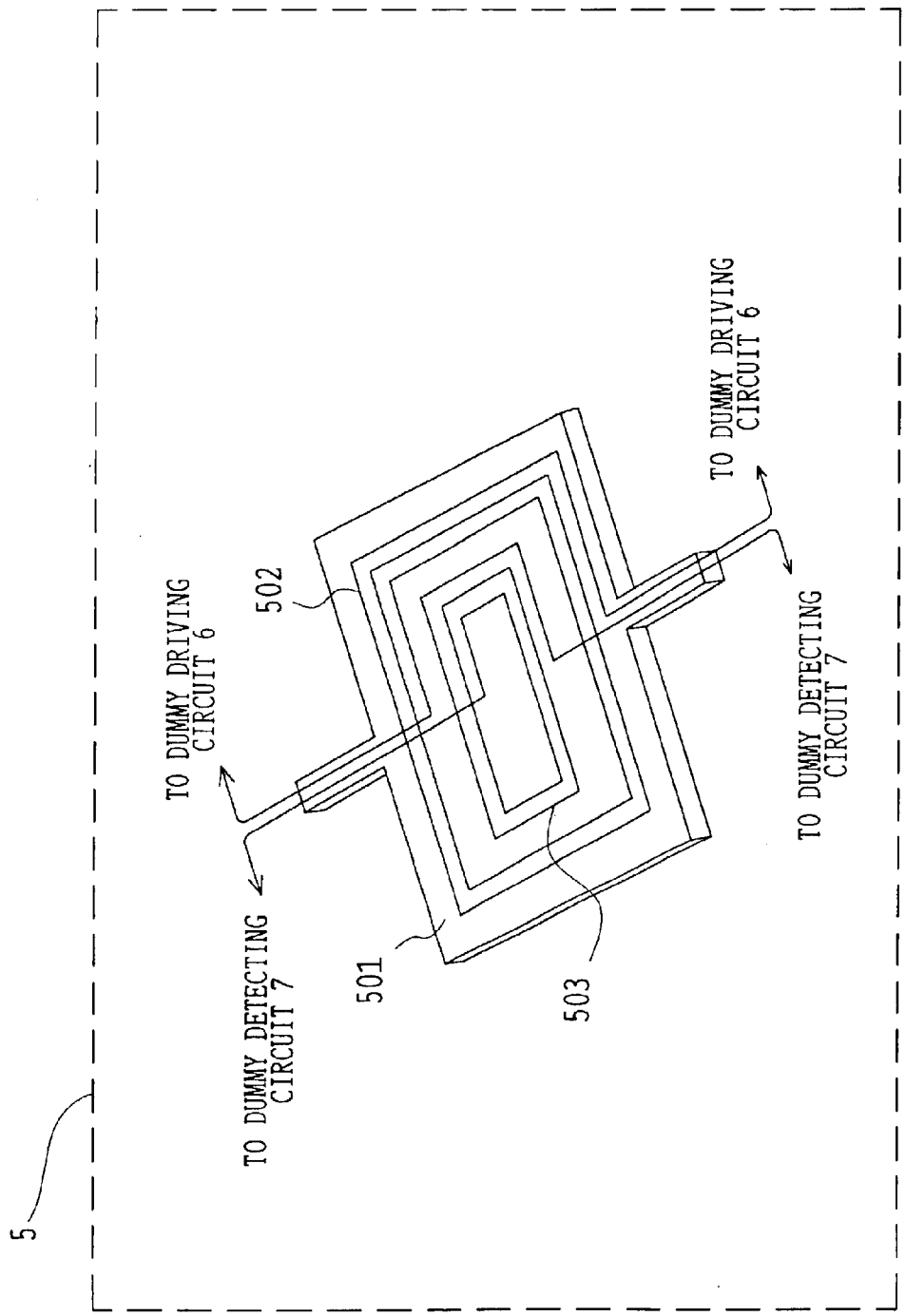
FIG. 17 is a view showing a schematic structure of a dummy scanner used in the third embodiment.

The dummy scanner 5, as illustrated in FIG. 17, has a substrate 501, a dummy driving coil 502, and a dummy sensor coil 503. Although it is desirable that the dummy scanner 5 is identical in shape and structure in the manufacturing process with a moving plate section (constructed with the mirror portion 101, the driving coil 102, the sensor coil 103, and the spring portions 104*a* and 104*b*) of the optical scanner 1, it is only necessary to at least meet the conditions described below.

The substrate 501, like a common electric circuit substrate, must be constructed of an electric insulator, and the mutual inductance with the mutual induction function of the dummy driving coil 502 and the dummy sensor coil 503 must be identical with that of the driving coil 102 and the sensor coil 103.

However, the dummy scanner 5, unlike the optical scanner 1 in FIG. 3, is not provided with permanent magnets corresponding to the two permanent magnets 105*a* and 105*b* arranged close to the mirror portion 101, for producing a magnetic field nearly parallel with the mirror face 101*a* where the mirror portion 101 is in a stationary state.

Figure 18:
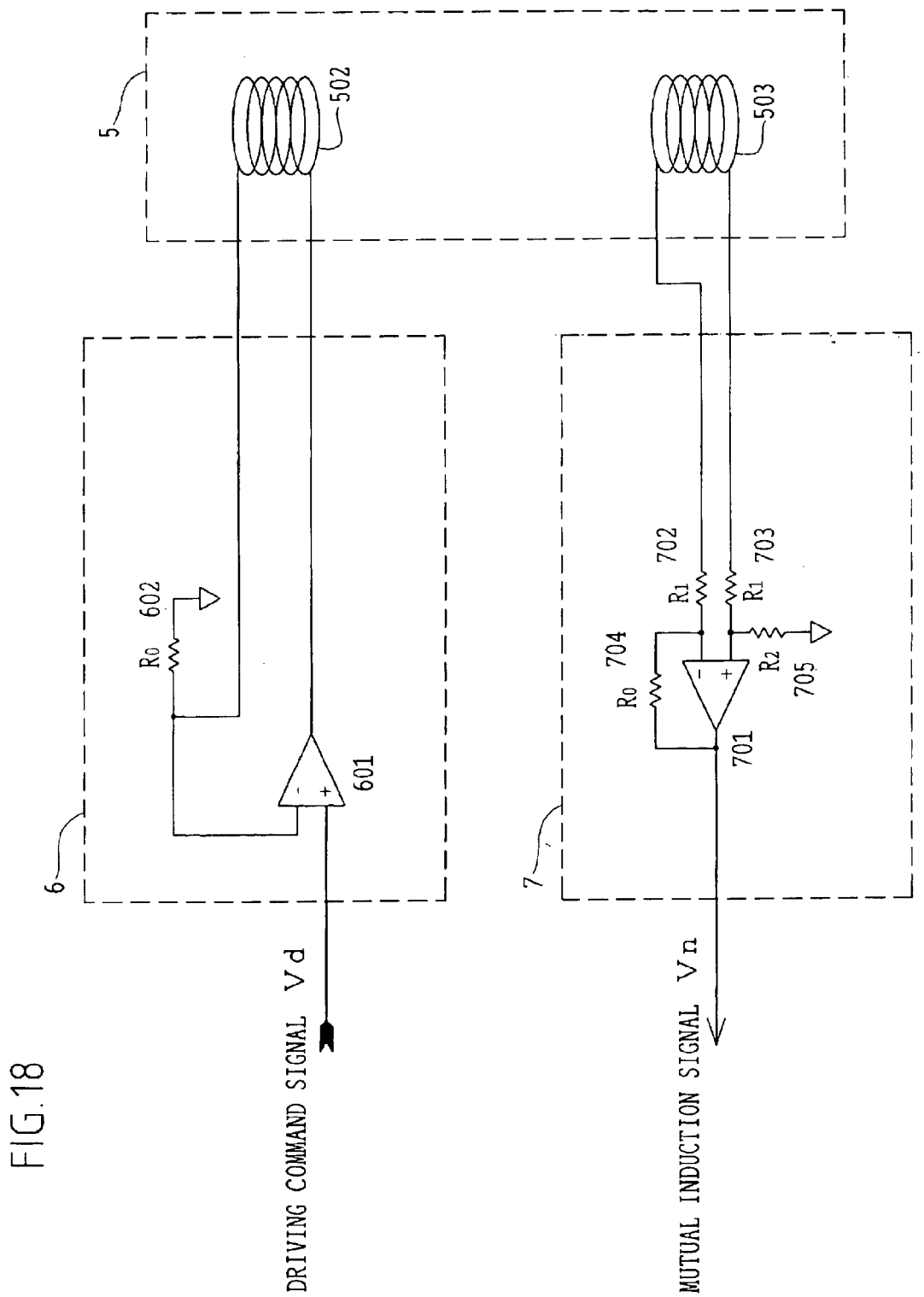
FIG. 18 is a diagram showing an example of the configurations of a dummy driving circuit and a dummy detecting circuit, used in the third embodiment.

The dummy driving circuit 6 is adapted to supply the current to the dummy driving coil 502 and, as shown in FIG. 18, includes an operational amplifier 601 and a resistance element (R0) 602.

The operational amplifier 601 and the resistance element (R0) 602 are constructed to be identical with the operational amplifier 201 and the resistance element (R0) 202, respectively, of the driving circuit 2 in FIG. 6. Thus, when the same driving command signal $V_d$ as in the driving circuit 2 is input into the dummy driving circuit 6 of FIG. 18, the dummy driving circuit 6 sends the driving signal (the alternating current) identical with that supplied to the driving coil 102 by the driving coil 2 to the dummy driving coil 502.

The dummy detecting circuit 7 is adapted to detect the electromotive force generated in the dummy sensor coil 503 and, as shown in FIG. 18, includes an operational amplifier 701, a resistance element (R1) 702, a resistance element (R1) 703, a resistance element (R2) 704, and a resistance element (R2) 705.

These are constructed to be identical with the operational amplifier 301, the resistance element (R1) 302, the resistance element (R1) 303, the resistance element (R2) 304, and the resistance element (R2) 305, respectively, of the detecting circuit 3-a in FIG. 6. Therefore, when the electromotive force identical with that generated in the sensor coil 103 is caused in the dummy sensor coil 503, the dummy detecting circuit 7 outputs the detecting signal identical with that output by the detecting circuit 3.

The subtraction circuit 8 shown in FIG. 16 is designed to subtract the output of the dummy detecting circuit 7 from the output of the detecting circuit 3.

The control circuit 4 is adapted to control the oscillating amplitude and frequency of the optical scanner 1 in accordance with the output of the subtraction circuit 8 (its details will be described later).

Subsequently, reference is made to the flow of the signal in the circuit block diagram shown in FIG. 16.

From the operating controller such as a PC, not shown, the control signal which is the command value of a desired driving condition of the optical scanner 1, such as the oscillating amplitude (the oscillating angle) or oscillating frequency of the optical scanner 1, is supplied to the control circuit 4. The control circuit 4 receives the control signal to output the driving command signal $V_d$ to the driving circuit 2. The driving circuit 2 sends the driving signal (the alternating current) to the driving coil 102 in accordance with the driving command signal $V_d$. The optical scanner 1 is thus oscillated at desired oscillating angle and oscillating frequency. In this case, at both ends of the sensor coil 103, the sensor coil 103 is interlinked with the magnetic field produced by the permanent magnets 105a and 105b and the electromotive force generated thereby is induced. Furthermore, at both ends of the sensor coil 103, the mutual induction electromotive force generated by supplying the alternating current to the driving coil 102 is induced. Such electromotive forces are changed by the detecting circuit 3 into the detecting signal $V_s$, which is output to the subtraction circuit 8.

The control circuit 4, on the other hand, sends the same signal as the driving command signal $V_d$ supplied to the driving circuit 2, to the dummy driving circuit 6 as well. The dummy driving circuit 6 sends the same signal as the driving signal (the alternating current) supplied to the driving coil 102 by the driving circuit 2, to the dummy driving coil 502 as well, in accordance with the driving command signal $V_d$. In this case, at both ends of the dummy sensor coil 503, only the mutual induction electromotive force generated by supplying the alternating current to the dummy driving coil 502 is induced. This mutual induction electromotive force $e_r$ is the same as that generated at both ends of the sensor coil 103. The mutual induction electromotive force $e_r$ is changed by the dummy detecting circuit 7 into a detecting signal $V_n$, which is output to the subtraction circuit 8.

In the subtraction circuit 8, the detecting signal $V_n$ output by the dummy detecting circuit 7 is subtracted from the detecting signal $V_s$ output by the detecting circuit 3, and a resulting signal $V_{s-n}$ is supplied to the control circuit 4. This signal $V_{s-n}$ exhibits only the electromotive force generated when the sensor coil 103 is interlinked with the magnetic field produced by the permanent magnets 105a and 105. The result is that the mutual induction electromotive force $e_r$ responsible for hindrance to the control of the optical scanner 1 with a high degree of accuracy can be eliminated.

In the control circuit 4, the subtraction signal $V_{s-n}$ is monitored so that when the oscillating amplitude (the oscillating angle) or oscillating frequency of the optical scanner 1 is out of a desired value, the driving command signal $V_d$ is compensated. In this way, the optical scanner 1 can be controlled with a high degree of accuracy.

Subsequently, the control circuit 4 will be specifically described.

Figure 19:
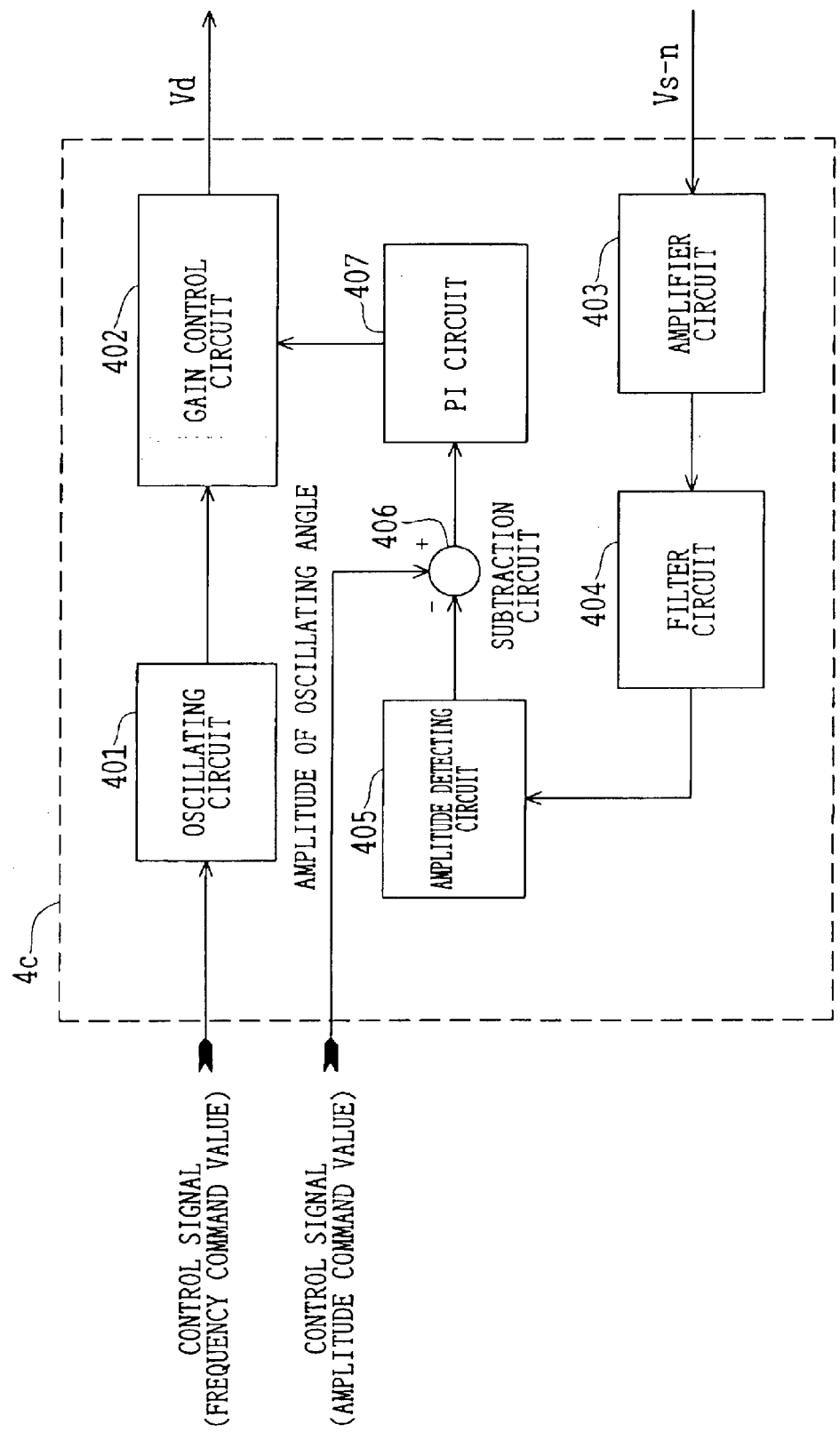
FIG. 19 is a block diagram showing an example of the construction of a control circuit used in the third embodiment.

FIG. 19 shows the construction of a control circuit 4c which is an example of the control circuit 4. In the control circuit 4a, the control signal includes two command values, the frequency command value and the amplitude command value, and the frequency command value is first supplied to the oscillating circuit 401. In the oscillating circuit 401, a sine-wave signal with a preset amplitude at a frequency indicated by the frequency command value, or a rectangular wave (a pulse wave) including a sine-wave component, is produced and is output to the gain control circuit 402. In the gain control circuit 402, the amplitude of the sine-wave signal (or the sine-wave component) output from the oscillating circuit 401 is controlled in accordance with the control signal output from the PI circuit 407, and the driving command signal $V_d$ is output.

On the other hand, when the signal $V_{s-n}$ output from the subtraction circuit 8 is delivered to the amplifier circuit 403, the amplitude of the signal $V_{s-n}$ is increased at a preset factor in the amplifier circuit 403 in order to facilitate the control of the amplitude, and this signal is output to the filter circuit 404.

The filter circuit 404 is constructed with a band-pass filter which extracts only the oscillating frequency component (the frequency component indicated by a frequency command value) and plays a role of noise elimination. Also, although it is most desirable that the filter circuit 404 is constructed with the band-pass filter, the same effect is brought about even when a low-pass filter or high-pass filter is used or the filter is not used, depending on the condition of noise. Also, even though the order of the amplifier circuit 403 and the filter circuit 404 is reversed, the same role can be played.

The signal $V_{s-n}$ in which the noise is eliminated by the filter circuit 404 is supplied to the amplitude detecting circuit 405.

The amplitude detecting circuit 405 is designed to detect an amplitude value (or an RMS value) of the signal $V_{s-n}$ so that a resulting detecting signal is output to the subtraction circuit 406. The subtraction circuit 406 is designed to find a deviation between the amplitude value of the signal $V_{s-n}$ to be supplied and the amplitude command value of another control signal so that a resulting deviation signal is output to the PI circuit 407. The PI circuit 407 has an I circuit (an integrating circuit) an a P circuit (a proportional circuit) so that the deviation signal is amplified by a preset gain in accordance with the frequency component of the deviation signal output from the subtraction circuit 406 and a resulting control signal is output to the gain control circuit 402.

Subsequently, the operation of the control circuit 4c will be explained.

In the initial condition where the optical scanner 1 is not oscillated, when the frequency command value (which is here thought of as the resonant frequency) of the control signal is output, the oscillating circuit 401 outputs the driving command signal. The driving command value output is supplied through the gain control circuit 402 to the driving circuit 2. In the initial condition, since the signal $V_{s-n}$ is zero and the amplitude command value of the second control signal is supplied to the subtraction circuit 406, the output of the subtraction circuit 406 becomes plus and the control signal produced in the PI circuit 407 is increased. Hence, the gain control circuit 402 is operated to increase the amplitude of the driving common signal. In this way, the optical scanner 1 starts the oscillation at a frequency indicated by the control signal (the frequency command value). An amplitude control section including the PI circuit 407 and the gain control circuit 402 is operated to increase the amplitude of the driving command signal $V_d$ until the output of the subtraction circuit 406 becomes zero, namely until the output signal $V_{s-n}$ from the subtraction circuit 8 agrees with the amplitude command value.

Conversely, where the signal $V_{s-n}$ exceeds the amplitude command value, the output of the subtraction circuit 406 becomes minus and the amplitude control section including the PI circuit 407 and the gain control circuit 402 is operated to decrease the amplitude of the driving command signal $V_d$.

In the control circuit 4c, the oscillating amplitude of the optical scanner 1 can thus be controlled to maintain a preset value.

Figure 20:
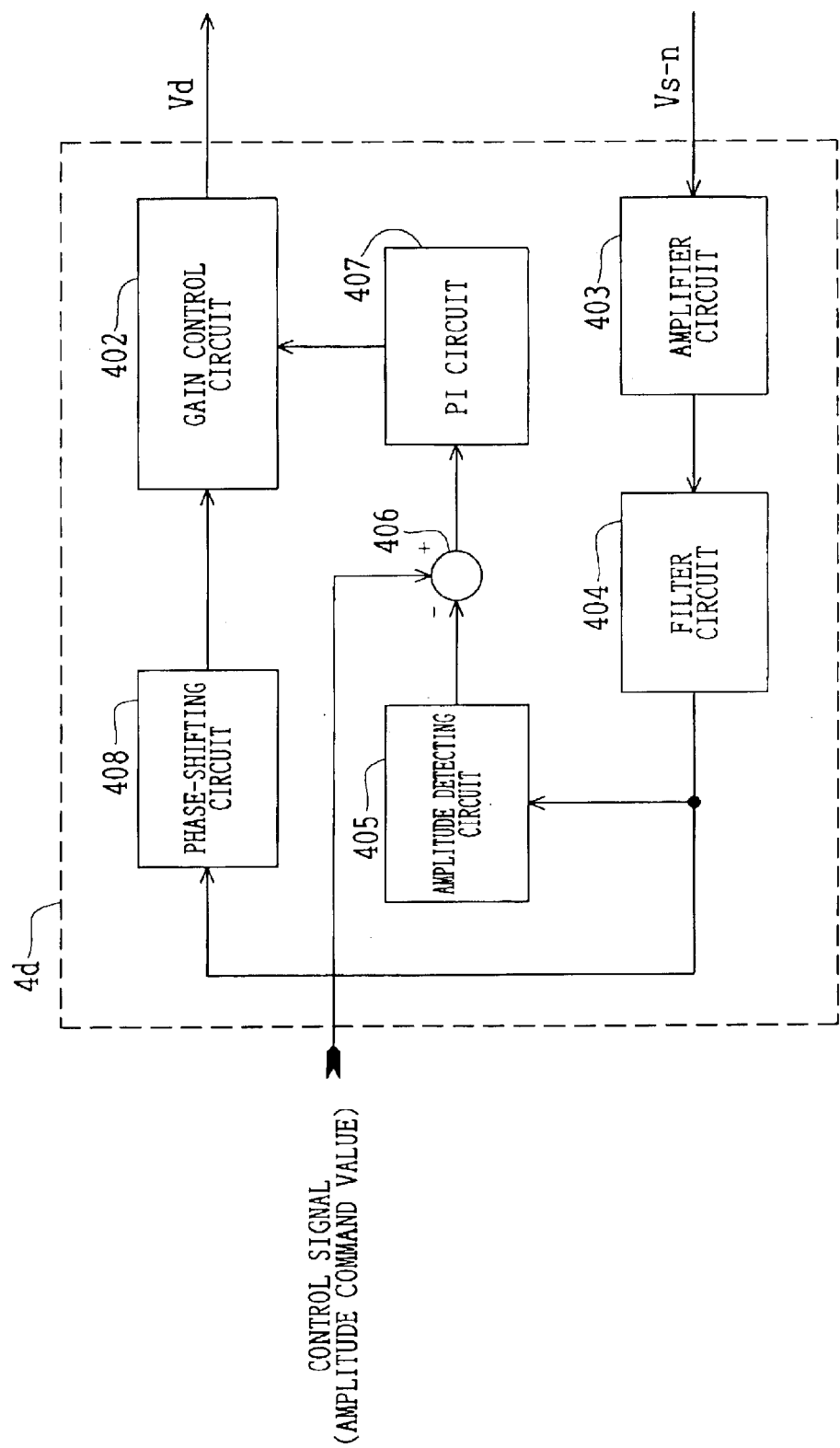
FIG. 20 is a block diagram showing another example of the construction of a control circuit used in the third embodiment.

FIG. 20 shows the construction of a control circuit 4d which is another example of the control circuit 4.

In FIG. 20, the control circuit 4d has the same construction as the control circuit 4c with the exception that the phase-shifting circuit 408 connecting to the filter circuit 404 is provided instead of the oscillating circuit 401 connected to the operating controller, not shown, in the control circuit 4c of FIG. 19.

In the control circuit 4d, the gain control circuit 402, the amplifier circuit 403, the filter circuit 404, the amplitude detecting circuit 405, the subtraction circuit 406, and the PI circuit 407 are constructed to have the same functions as those in the control circuit 4c of FIG. 16.

The phase-shifting circuit 408 is adapted to make phase adjustment so that the driving command signal $V_d$ output from the gain control circuit 402 agrees in phase with the signal $V_{s-n}$ supplied to the amplifier circuit 403 (because both signals agree in phase with each other in the oscillation at the resonant frequency), and is constructed so that the signal is delivered to gain control circuit 402 by shifting the phase of the output of the filter circuit 404. Also, the amount of phase adjustment made here is governed by the amount of phase shift at each of the amplifier circuit 403, the filter circuit 404, and the gain control circuit 402.

In the control circuit 4d constructed as mentioned above, the positive feedback loop is constructed with an amplifier circuit 403, a filter circuit 404, a phase-shifting circuit 408, and a gain control circuit 402. In the initial condition, as in the control circuit 4c of FIG. 19, the gain of the negative feedback loop becomes at least 1 due to the amplitude control section including the PI circuit 407 and the gain control circuit 402, and hence the oscillation is started. That is, the optical scanner 1 is oscillated at the resonant frequency and, at the same time, the oscillating amplitude is controlled by the amplitude control section.

In this way, in the control circuit 4d, the oscillating frequency of the optical scanner 1 is controlled to follow up the mechanical resonant frequency, and the oscillating amplitude can be controlled to maintain the preset value.

According to the driving circuit for an optical scanner of the third embodiment, therefore, the optical scanner 1 can be controlled in regard to the amplitude or the amplitude and frequency with a high degree of accuracy.

In the driving circuit for an optical scanner of the third embodiment of the present invention, however, the following two problems remain.

First, the optical scanner mentioned above, including the conventional one, is driven by the current and thus tends to increase power consumption. In the case of the optical scanner using the driving circuit for an optical scanner of the first embodiment, a twofold power is consumed due to the currents flowing through the optical scanner and the dummy scanner.

Second, in the case of a microscanner fabricated by using the semiconductor process, driving efficiency is favorable and power consumption is lessened. However, the mutual induction electromotive force is also lessened, and it becomes difficult that the dummy scanner is used to eliminate the mutual induction electromotive force with a high degree of accuracy.

Subsequently, a description will be given of the driving circuit for an optical scanner according to the fourth embodiment of the present invention which is configured for the purpose of lowering the power consumption or improving the S/N ratio.

Fourth Embodiment

Figure 21:
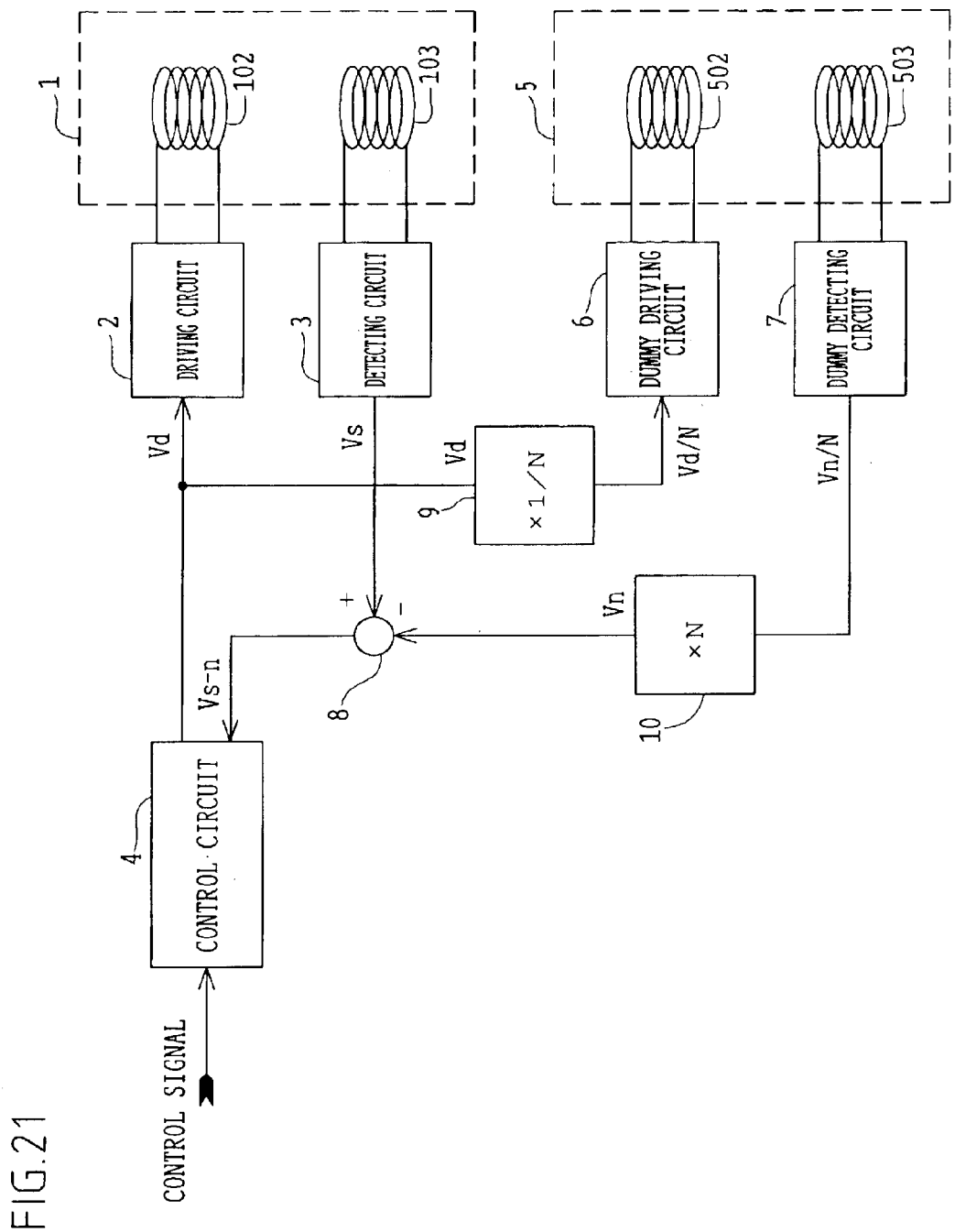
FIG. 21 is a block diagram showing a schematic construction of a fourth embodiment of the present invention.

FIG. 21 shows a schematic construction of the driving circuit for an optical scanner of the fourth embodiment in the present invention.

In addition to the construction of the driving circuit for an optical scanner of the third embodiment shown in FIG. 16, the driving circuit for an optical scanner of the fourth embodiment has a first gain circuit 9 and a second gain circuit 10. In FIG. 21, the optical scanner 1, the driving circuit 2, the detecting circuit 3, the control circuit 4, the dummy scanner 5, the dummy driving circuit 6, the dummy detecting circuit 7, and the subtraction circuit 8 are constructed to be identical with those in the third embodiment of FIG. 16.

The first gain circuit 9 is configured so that the driving command signal $V_d$ becomes I/N-fold and a resulting signal is supplied to the dummy driving circuit 6. Here, reference symbol N represents a positive real number.

The second gain circuit 10 is constructed so that the output signal $V_n$ of the dummy detecting circuit 7 is increased N-fold and a resulting signal is supplied to the subtraction circuit 8.

Subsequently, reference is made to the flow of the signal in the driving circuit for an optical scanner of the fourth embodiment.

When the driving command signal $V_d$ is output from the control circuit 4, the value of the signal supplied to the dummy driving circuit 6 by the first gain circuit 9 becomes $V_d/N$, and the signal level of the driving signal (the alternating current) supplied to the dummy driving coil 502 becomes 1/N. As a result, the mutual induction electromotive force $e_r$ induced to the dummy sensor coil 503 also becomes 1/N. This is because the mutual induction electromotive force $e_r$, as shown in Eq. (11), is proportional to the current flowing through the dummy driving coil 502. The mutual induction electromotive force $e_r$ is changed by the dummy detecting circuit 7 into a detecting signal $V_n/N$, which is increased N-fold and is delivered to the subtraction circuit 8.

Thus, according to the driving circuit for an optical scanner of the fourth embodiment, when the value of N is set to be 1<<N in the first gain circuit and the second gain circuit, the current flowing through the dummy driving coil 502 can be reduced to 1/N without changing the signal $V_s$ expressing the mutual induction electromotive force supplied to the subtraction circuit 8. This is effective for the reduction of the power consumption.

When N is set to be 0<N<1, the effect of the reduction of the power consumption is lost, but the signal level extending from the dummy driving circuit 6 to the dummy detecting circuit 7 can be increased. Moreover, the mutual induction electromotive force can be eliminated with a high degree of accuracy and an effect is brought about on the improvement of the S/N ratio.

If the mutual inductance is the same as the mutual inductance M caused by the dummy driving coil and the dummy sensor coil in the third and fourth embodiments, the dummy scanner 5 may be constructed by using transducers as a dummy driving transducer and a dummy sensor transducer, instead of the dummy driving coil and the dummy sensor coil, respectively.

Fifth Embodiment

Figure 22:
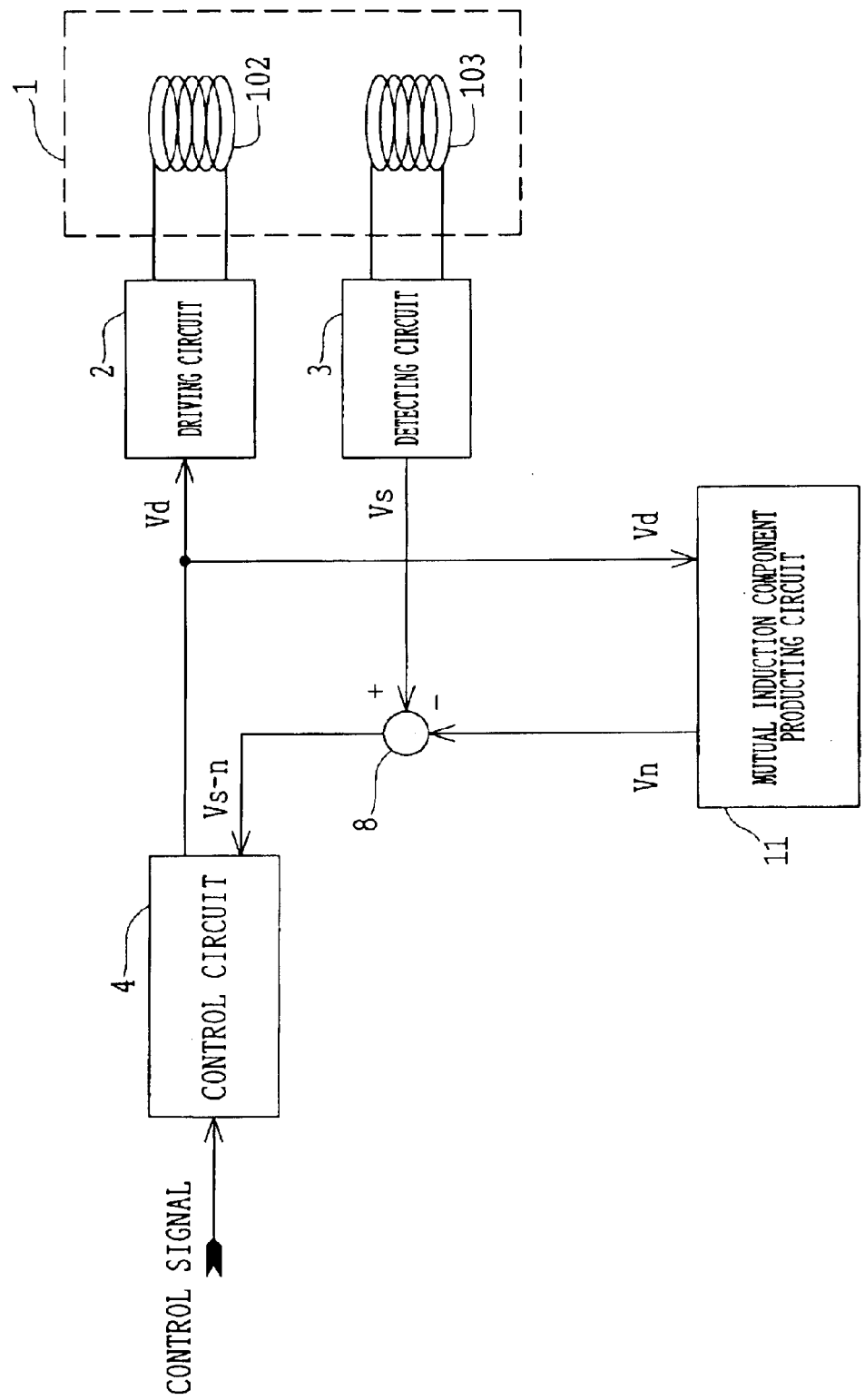
FIG. 22 is a block diagram showing a schematic construction of a fifth embodiment of the present invention.

FIG. 22 shows a schematic construction of the driving circuit for an optical scanner of the fifth embodiment in the present invention.

In addition to the construction of the driving circuit for an optical scanner in FIG. 5, the driving circuit for an optical scanner of the fifth embodiment has a mutual induction component producing circuit 11 and the subtraction circuit 8.

The optical scanner 1, the driving circuit 2, and the detecting circuit 3, shown in FIG. 22, are almost the same as those described relative to the prior art in FIGS. 3 and 5.

Figure 23:
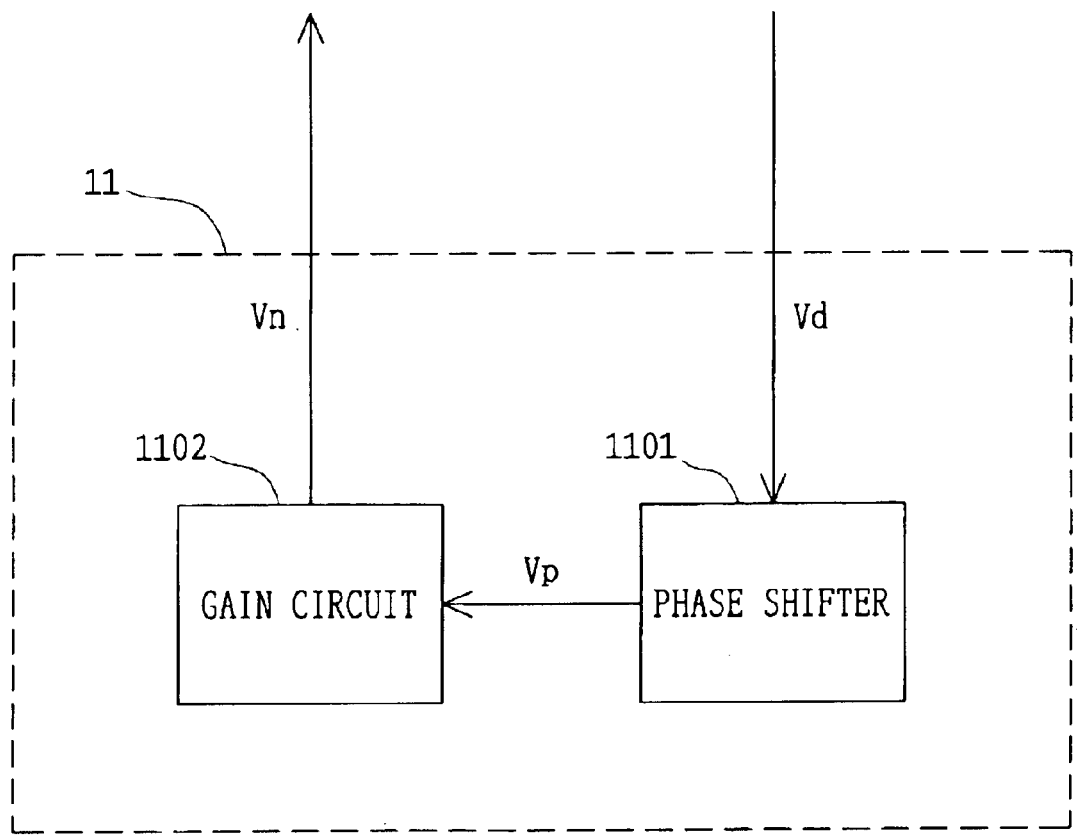
FIG. 23 is a block diagram showing a schematic construction of a mutual induction component producing circuit used in the fifth embodiment.

The mutual induction component producing circuit 11, as shown in FIG. 23, has a phase shifter 1101 and a gain circuit 1102.

The phase shifter 1101 is constructed so that an input signal is 90° ahead in phase. Although it is desirable for design that the phase shifter 1101 is constructed with a second-order high-pass filter which is 90° ahead in phase with a cutoff frequency, a third- or higher-order high-pass filter or an inverting circuit may be combined with a second- or higher-order low-pass filter.

The gain circuit 1102 is designed to increase or decrease the signal level of the phase shifter 1101. It is desirable that the gain circuit 1102 is constructed so that the gain is simply changed by the replacement of the resistance element or a variable resistor, but it may be constructed with a variable programmable amplifying IC.

The subtraction circuit 8 is designed to subtract the output of the mutual induction component producing circuit 11 from the output of the detecting circuit 3.

The control circuit 4 is adapted to control the oscillating amplitude and frequency of the optical scanner 1 in accordance with the output of the subtraction circuit 8. The specific configuration and operation of the control circuit 4 are the same as in the control circuit 4c or 4d shown in FIG. 19 or 20.

Subsequently, reference is made to the flow of the signal in the circuit block diagram shown in FIG. 22.

From the operating controller such as a PC, not shown, the control signal which is the command value of a desired driving condition of the optical scanner 1, such as the oscillating amplitude (the oscillating angle) or oscillating frequency of the optical scanner 1, is supplied to the control circuit 4. The control circuit 4 receives the control signal to output the driving command signal $V_d$ to the driving circuit 2. The driving circuit 2 sends the driving signal (the alternating current) to the driving coil 102 in accordance with the driving command signal $V_d$. The optical scanner 1 is thus oscillated at desired oscillating angle and oscillating frequency. In this case, at both ends of the sensor coil 103, the sensor coil 103 is interlinked with the magnetic field produced by the permanent magnets 105a and 105b and the electromotive force generated thereby is induced. Furthermore, at both ends of the sensor coil 103, the mutual induction electromotive force $e_r$ generated by supplying the alternating current to the driving coil 102 is induced. Such electromotive forces are changed by the detecting circuit 3 into the detecting signal $V_s$, which is output to the subtraction circuit 8.

The control circuit 4, on the other hand, sends the same signal as the driving command signal $V_d$ supplied to the driving circuit 2, to the phase shifter 1101 of the mutual induction component producing circuit 11. The phase shifter 1101 is such that a signal $V_p$ in which the driving command signal $V_d$ is 90° ahead in phase is supplied to the gain control circuit 1102. When $V_d = R_0 I_0 \sin(\omega_c t)$ form Eq. (9), the signal $V_p$ can be expressed as $$V_p = A \cdot R_0 \cdot I_0 \cos(\omega_c t) \tag{20}$$

where A is a constant. Here, the constant A is a value depending on a change of the signal level caused when the phase is shifted by the high-pass filter. For example, in the case of the second-order high-pass filter, the signal is decreased 3 dB with the cutoff frequency, and thus the value of the constant A is about 0.708. The signal $V_p$ is sent to the gain 1102. In the gain circuit 1102, the signal level of the signal $V_p$ is gained (N-fold). The real number N is set so that the signal $V_p$ coincides with the signal $V_n$ given by the following equation, that is, the term of the signal $V_r$ of Eq. (12):

$$V_n = \frac{-2R_2}{2R_1 + R_{sens}} \cdot e_r = \frac{-2R_2}{2R_1 + R_{sens}} \alpha M \omega_c I_0 \cos(\omega_c t) \tag{21}$$

The real number N is given by $$N = \frac{1}{A \cdot R_0} \cdot \frac{-2R_2}{2R_1 + R_{sens}} \alpha M \omega_c \tag{22}$$

In the gain circuit 1102, the value $V_n$ (=N·$V_p$) in which the signal level of the signal $V_p$ is gained N-fold is supplied to the subtraction circuit 8.

In the subtraction circuit 8, the signal $V_n$ output by the gain circuit 1102 is subtracted from the detecting signal $V_s$ output by the detecting circuit 3, and a resulting signal $V_{n-s}$ is sent to the control circuit 4. This signal exhibits only the electromotive force generated when the sensor coil 103 is interlinked with the magnetic field produced by the permanent magnets 105a and 105b. The result is that the mutual induction electromotive force responsible for hindrance to the control of the optical scanner 1 with a high degree of accuracy can be eliminated.

In the control circuit 4, the subtraction signal $V_{s-n}$ is monitored so that when the oscillating amplitude (the oscillating angle) or oscillating frequency of the optical scanner 1 deviates from a desired value, the driving command signal $V_d$ is compensated. In this way, the optical scanner 1 can be controlled with a high degree of accuracy. In the fifth embodiment, even when the phase shifter 1101 and the gain circuit 1102 is replaced with each other, the same effect can be brought about.

Thus, according to the driving circuit for an optical scanner of the fifth embodiment, the optical scanner 1 can be controlled in regard to the amplitude or the amplitude and frequency with a high degree of accuracy.

The driving circuit for an optical scanner of the present invention is not limited to the application to the optical scanner used in each of the third to fifth embodiments, and is applicable to each of optical scanners with other mechanisms. The same effect as in the case of the application to the optical scanner in each of the third to fifth embodiments can be secured.

Examples of optical scanners with other mechanisms are disclosed in U.S. Pat. Nos. 4,990,808 and 4,919,500. The constructions of such optical scanners are described below.

Figure 24:
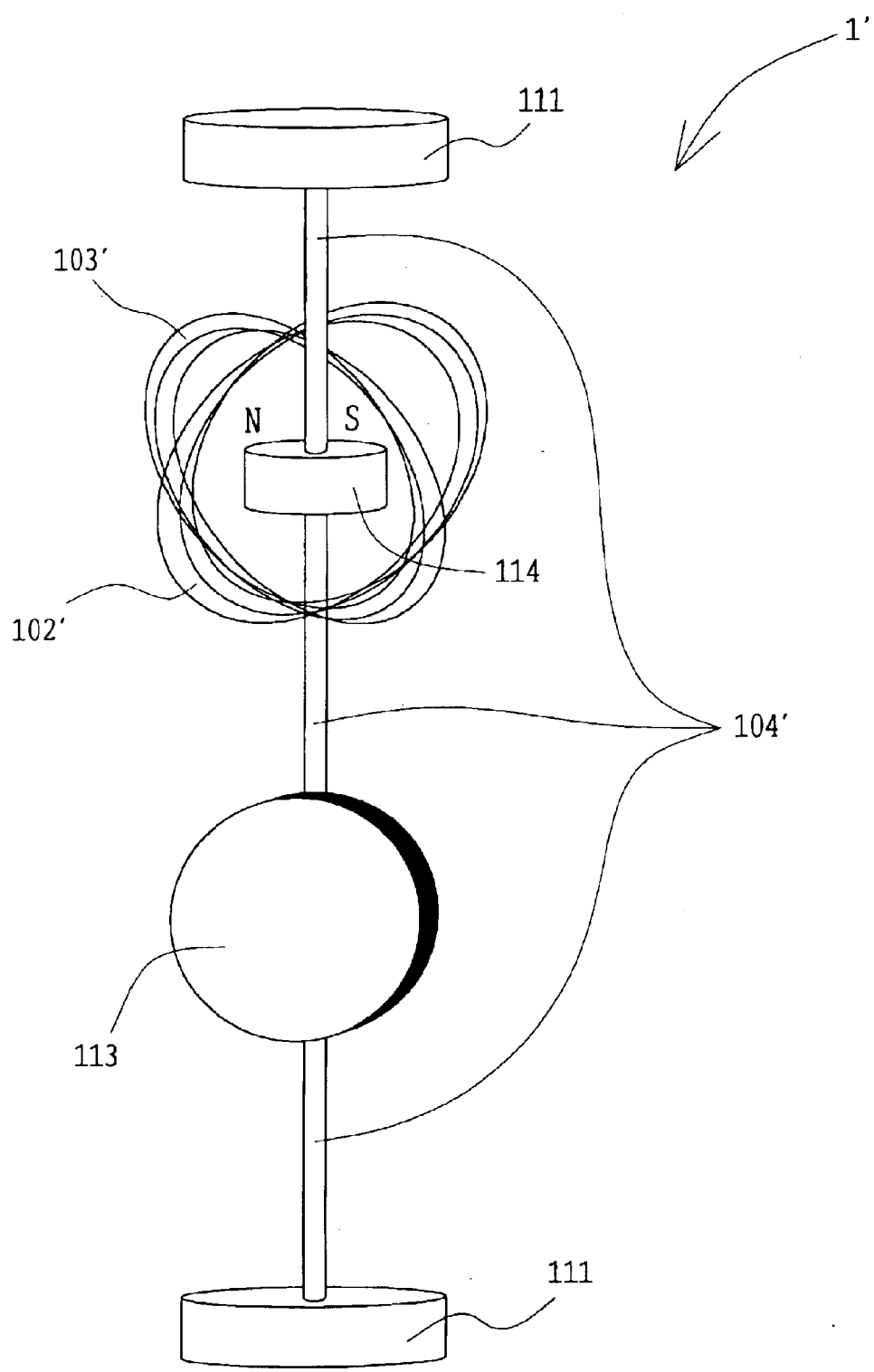
FIG. 24 is a view showing a schematic structure of another example of the optical scanner to which the driving circuit of the present invention is applied.

FIG. 24 shows a schematic structure of another example of the optical scanner to which the driving circuit for an optical scanner of the present invention is applicable.

A optical scanner 1' illustrated in FIG. 24 is such that a mirror 113 and a permanent magnet 114 are provided in series to a torsion bar 104' connected to holders 111 to be mounted to an arbitrary apparatus (not shown), and a driving coil 102' and a sensor coil 103' are provided in the proximity of the permanent magnet 114 so as to surround it.

Here, the sensor coil 103' for detecting the oscillating angle of the torsional oscillation of the mirror 113 is provided perpendicular to the driving coil 102'.

The driving coil 102' and the sensor coil 103' are fixed (stationary) with respect to the permanent magnet 114 rotatable through the torsion bar 104', and is fixed here to the holding section of the apparatus, not shown, constructed integrally with the holders 111.

Next, the operation of the optical scanner 1' in FIG. 24 is briefly described.

When a driving current including the alternating-current component is supplied to the driving coil 102', a force obeying the left-hand rule is generated between the driving coil 102' and the permanent magnet 114.

Since the driving coil 102' is fixed to the holding section of the apparatus, not shown, the force obeying the left-hand rule is applied to the permanent magnet 114, and the torsional operation of the torsion bar 104' is performed through the permanent magnet 114.

The driving current including the alternating current is supplied to the driving coil 102', and hence the direction of the force obeying the left-hand rule applied to the permanent magnet 114 is changed with the alternating-current component. Consequently, the permanent magnet 114 starts a torsional rotating motion, with the torsion bar 104' as its center.

In the optical scanner 1 of each of the third to fifth embodiments, the permanent magnets 105a and 105b are fixed, and the side provided with the driving coil 102 and the sensor coil 103 is torsion-oscillated. However, in the optical scanner 1' shown in FIG. 24, the permanent magnet 114 and the mirror 113 are connected in series to the torsion bar 104', and therefore the mirror 113 also executes the torsional rotating motion at the same frequency as in the permanent magnet 114 to the torsional rotating motion of the torsion bar 104' caused by the force of the left-hand rule applied to the permanent magnet 114.

Thus, in the optical scanner 1' of FIG. 24, the driving current flows through the driving coil 102' and thereby the mirror 113 can be torsion-oscillated.

When the permanent magnet 114 performs the torsional rotating motion, with the torsion bar 104' as its center, the magnetic field with which the sensor coil 103' is interlinked is changed, and thus the electromotive force corresponding to the oscillating amplitude of the torsional rotating motion is generated in the sensor coil 103'. Whereby, the oscillating amplitude of the torsional oscillation of the mirror 113 can be detected.

When the driving coil 102' and the sensor coil 103' of the optical scanner 1' constructed as mentioned above is made to correspond to the driving coil 102 and the sensor coil 103 of the optical scanner 1, respectively, in the third to fifth embodiments, an optical scanner in which the magnet 114 is excluded from FIG. 24 is added to the construction of FIG. 24 as a dummy scanner to use the driving circuit for an optical scanner of the present invention, and thereby the same effect as in the case where it is applied to the optical scanner 1 in the third to fifth embodiments can be obtained.

Figure 25:
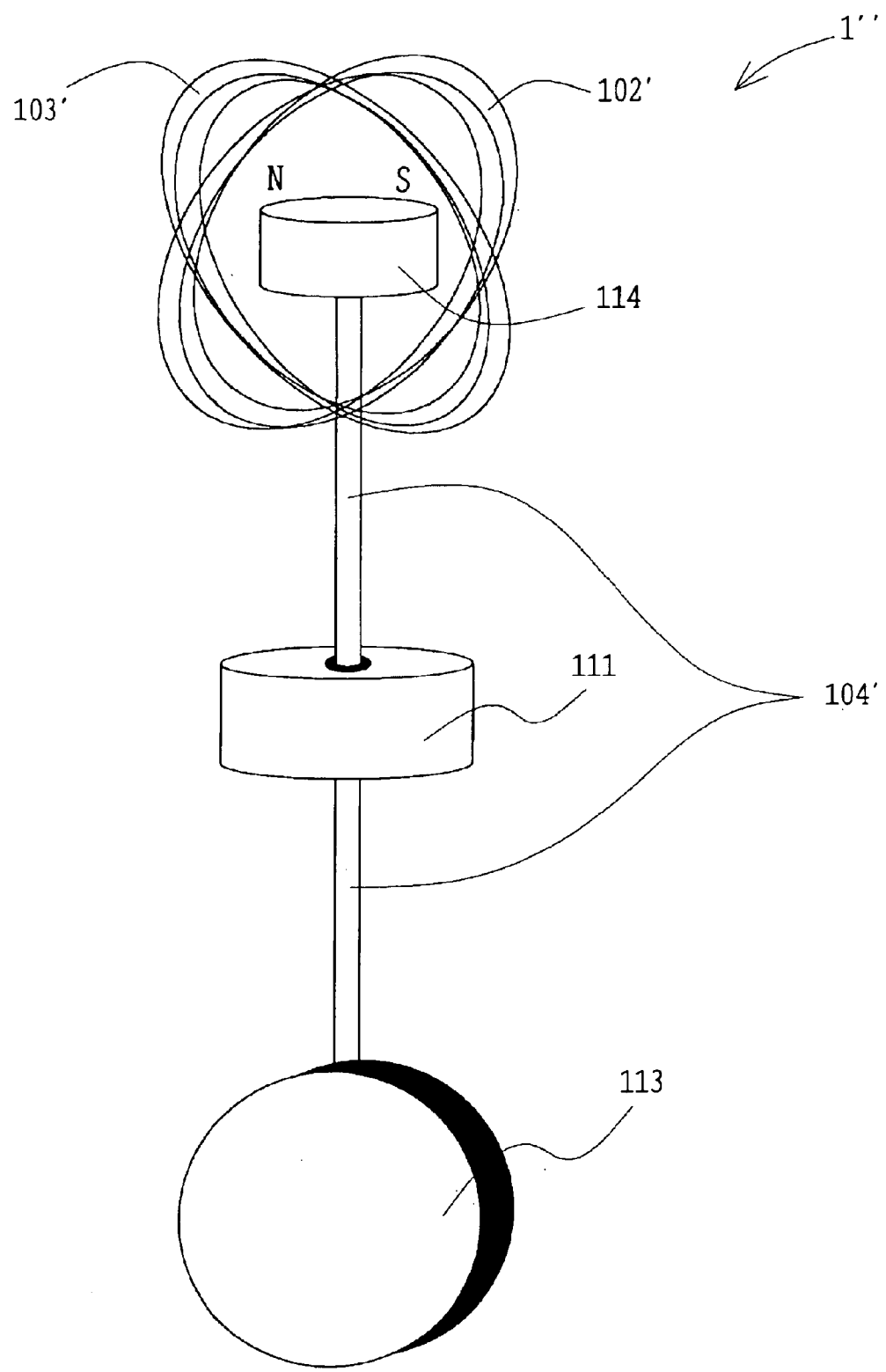
FIG. 25 is a view showing a schematic structure of still another example of the optical scanner to which the driving circuit of the present invention is applied.

FIG. 25 shows a schematic structure of the optical scanner, different from the optical scanner in each of the third to fifth embodiments and FIG. 24, to which the driving circuit for an optical scanner of the present invention is applicable.

An optical scanner 1" has the same structure as the optical scanner 1' of FIG. 24 with the exception that the permanent magnet 114 and the mirror 113 are spaced from the single holder 111. Its operating principle is the same as in the optical scanner 1' of FIG. 24, and the mirror 113 can be torsion-oscillated by supplying the driving current to the driving coil 102'.

The electromotive force according to the torsional rotating motion, with the torsion bar 104' as its center, is generated in the permanent magnet 114, and thereby the torsional oscillating condition of the mirror 113 can be detected.

In the optical scanner 1" shown in FIG. 25, like the optical scanner 1' in FIG. 24, when the driving circuit for an optical scanner of the present invention is used, the same effect as in the case where it is applied to the optical scanner 1 in the third to fifth embodiments can be brought about.

According to the present invention, therefore, the mutual induction electromotive force generated in the sensor coil can be eliminated, so that the driving circuit for an optical scanner which is capable of controlling the oscillating condition with a high degree of accuracy can be provided.

Sixth Embodiment

Figure 26:
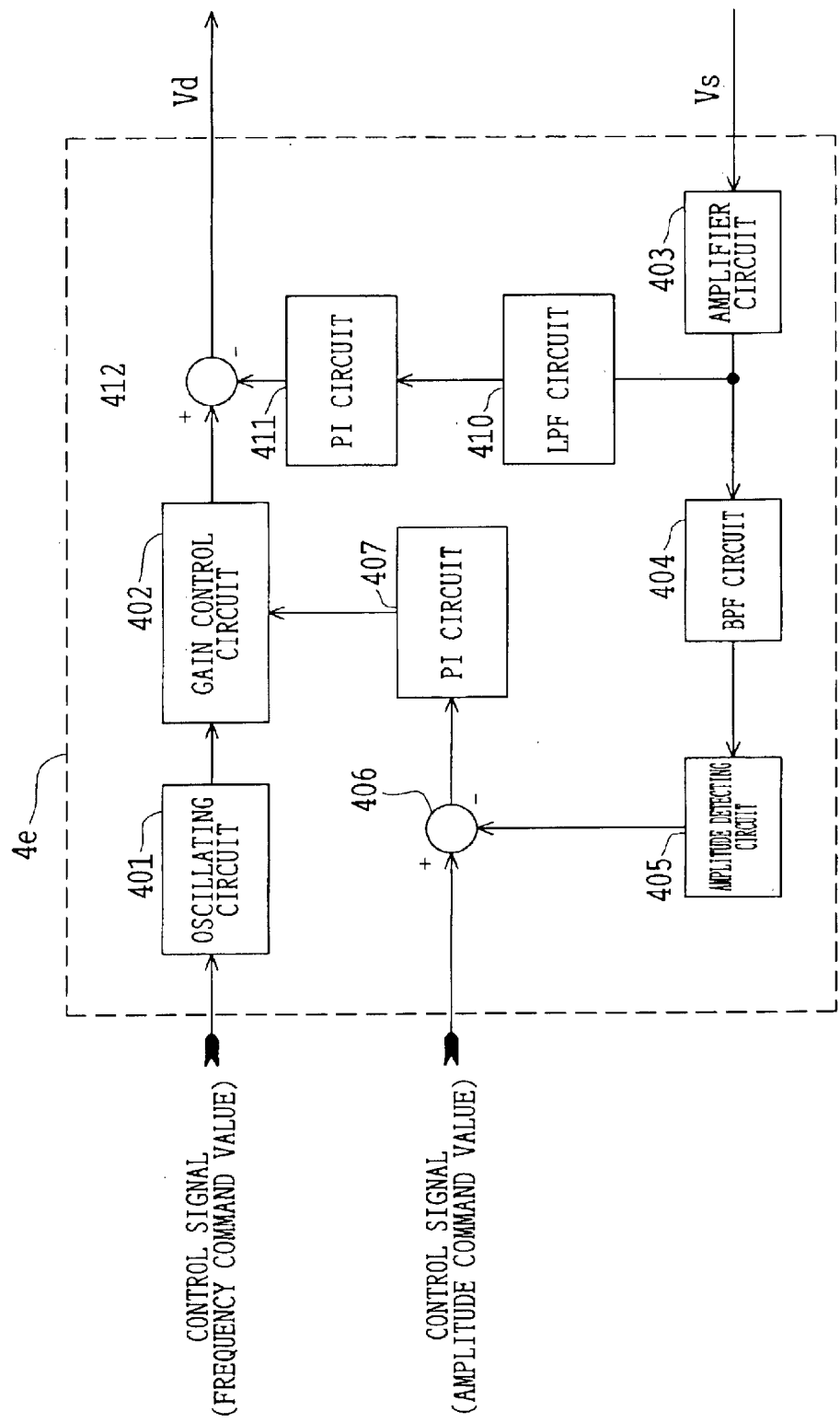
FIG. 26 is a view showing the construction of a control circuit used in a sixth embodiment of the present invention.

FIG. 26 is a block diagram showing a control circuit 4e for controlling the oscillating amplitude and frequency of the optical scanner 1 in accordance with the detecting signal $V_s$ output by the detecting circuit 3. The great advantage of the sixth embodiment of the driving circuit for an optical scanner according to the present invention lies in the circuit configuration of the control circuit 4e.

The control circuit of this embodiment is constructed so that the resonant frequency follow-up control is not made and the oscillating frequency is open-controlled by the oscillating circuit 401.

The control circuit 4e has a function (an oscillating amplitude control function) of oscillating the optical scanner 1 at the desired oscillating amplitude (the oscillating angle) by constructing the negative feedback loop with the amplifier circuit 403, the BPF (band-pass filter) circuit 404, the amplitude detecting circuit 405, the subtraction circuit 406, the PI circuit 407, the gain control circuit 402, and a subtraction circuit 412.

The control circuit 4e also has a function (a constant oscillation control function) of eliminating the oscillation of the optical scanner 1, other than the desired oscillating motion, by constructing the negative feedback loop with the amplifier circuit 403, an LPF (low-pass filter) circuit 410, a PI circuit 411, and the subtraction circuit 412.

In FIG. 26, the control signal includes two command values, the frequency command value and the amplitude command value, and the frequency command value is first supplied to the oscillating circuit 401. In the oscillating circuit 401, a sine-wave signal with a preset amplitude at a frequency indicated by the frequency command value, or a rectangular wave (a pulse wave) including a sine-wave component, is produced and is output to the gain control circuit 402. In the gain control circuit 402, the amplitude of the sine-wave signal (or the rectangular or pulse wave including the sine-wave component) output from the oscillating circuit 401 is controlled in accordance with the control signal output from the PI circuit 407, and a resulting signal is output to the subtraction circuit 412.

The amplifier circuit 403 is designed to increase the amplitude at a preset factor in order to facilitate the control of the signal level (signal amplitude) of the detecting signal $V_s$ and to supply a resulting signal to the BPF circuit 404 and the LPF circuit 410.

The BFP circuit 404 is constructed with a band-pass filter which extracts only the oscillating frequency component (the frequency component indicated by the frequency command value). Where a high-frequency noise lessens, the BPF circuit 404 may be constructed with an HPF (high-pass filter) circuit and in this case, the same effect can be obtained.

The amplitude detecting circuit 405 is designed to detect an amplitude value (or an RMS value) of the supplied signal so that a resulting detecting signal is output to the subtraction circuit 406. The subtraction circuit 406 is adapted to find a deviation between an amplitude value obtained by the amplitude detecting circuit 405 and an amplitude command value which is the control signal so that a resulting deviation signal is output to the PI circuit 407. The PI circuit 407 has an I circuit (an integrating circuit) an a P circuit (a proportional circuit) so that the deviation signal output from the subtraction circuit 406 is amplified by a preset gain and a resulting control signal is output to the gain control circuit 402.

Figure 28A:
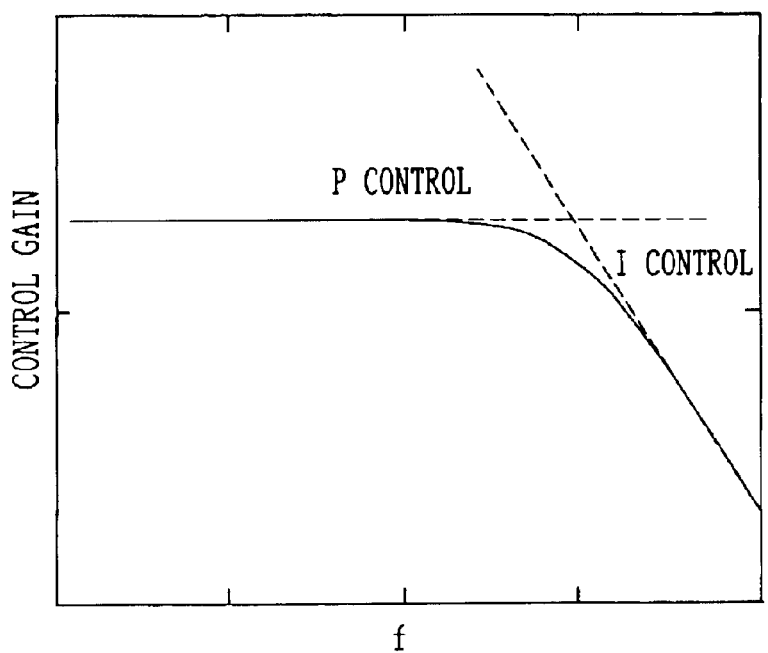
FIG. 28A is a graph showing gain characteristics where a PI circuit in FIGS. 26 and 27 is constructed with a P control circuit (proportional circuit) and an I control circuit (integrating circuit)
Figure 28B:
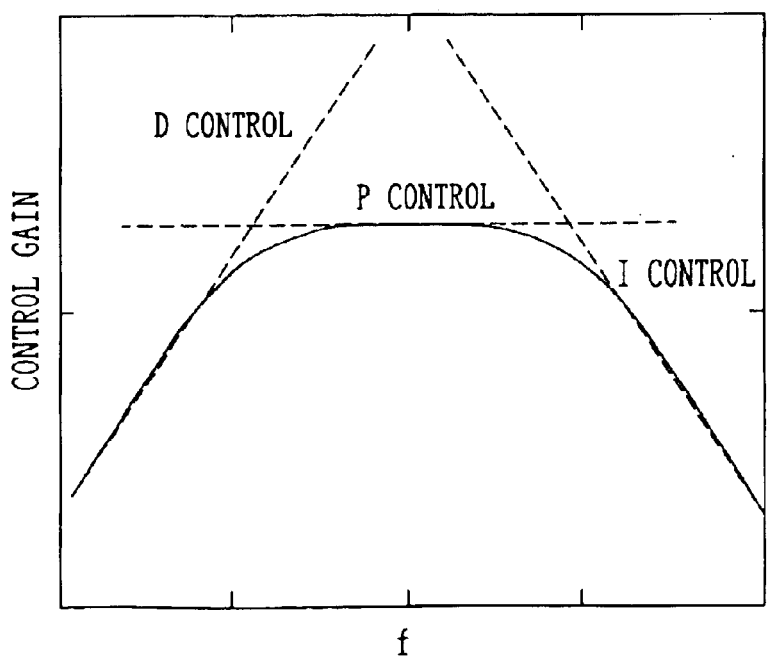
FIG. 28B is a graph showing gain characteristics where the PI circuit in FIGS. 26 and 27 is constructed with the P control circuit (proportional circuit), the I control circuit (integrating circuit), and a D control circuit (differentiating circuit)

The LPF circuit 410 is constructed with a low-pass filter which extracts only the frequency component lower than a desired oscillating frequency (a frequency indicated by the frequency command value). The PI circuit 411 is designed to apply a desired gain to a low-frequency component extracted by the LPF circuit 410 and has an I control circuit (an integrating circuit) and a P control circuit (a proportional circuit). The PI circuit 411, unlike the common PI circuit such as the PI circuit 407, has gain characteristics in which the gain of a DC component is suppressed by the P control as shown in FIG. 28A. It is for this reason that, as seen from Eq. (8), in the DC region in which the frequency f is zero, the electromotive force $V_r$ generated in the sensor coil 103 becomes zero, that is, the DC operation of the mirror portion 101 cannot be detected by the sensor coil 103, and thus an increase of the gain in the DC region is responsible for degradation in accuracy of the oscillation control of the moving plate. From this viewpoint, when the PI circuit 411 is changed to a circuit adding gain characteristics such as those shown in FIG. 28B, namely a D control circuit (differentiating circuit), a further effect is brought about. The output (that is, the control signal) of the PI circuit 411 is supplied to the subtraction circuit 412. In the subtraction circuit 412, the output of the PI circuit 411 is subtracted from the output of the gain control circuit 402, and a resulting signal is output as the driving command signal $V_d$.

Subsequently, reference is made to the operation of the control driving circuit of the optical scanner shown in each of FIGS. 3, 5, 6, and 26.

In the initial condition where the optical scanner 1 is not oscillated, the frequency command value of the control signal is supplied to the oscillating circuit 401. In the oscillating circuit 401, a sine-wave signal with a preset amplitude at a frequency indicated by the frequency command value, or a rectangular wave (a pulse wave) including a sine-wave component, is produced and is output to the gain control circuit 402.

On the other hand, the output $V_s$ of the detecting circuit 3 is zero and the amplitude command value of the control signal is supplied to the subtraction circuit 406. Hence, the output of the subtraction circuit 406 becomes plus and the control signal produced in the PI circuit 407 is increased. As a result, the optical scanner 1 starts the oscillating motion at the frequency indicated by the frequency command value, and the gain control circuit 402 is operated to increase the oscillating amplitude of the optical scanner 1 until the output $V_s$ of the detecting circuit 3 agrees with the amplitude command value (until the output of the subtraction circuit 406 becomes zero).

Conversely, where the output $V_s$ of the detecting circuit 3 exceeds the amplitude command value, the gain control circuit 402 is operated to decrease the amplitude of a sine wave (a rectangular wave or pulse wave) signal output from the oscillating circuit 401 and to decrease the oscillating amplitude of the optical scanner 1.

Figure 9A:
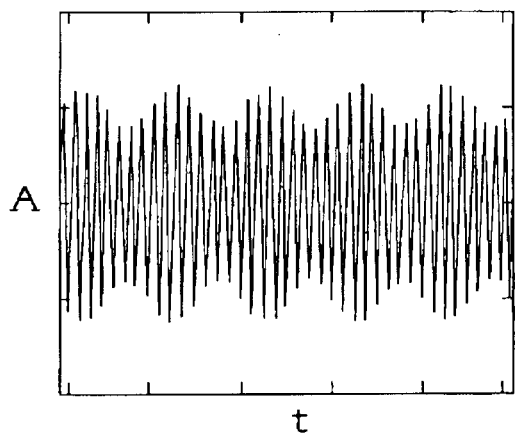
FIG. 9A is a graph showing a state where an amplitude-modulation noise is produced with respect to the oscillating motion of the optical scanner.

In this way, the control circuit 4e is capable of performing the oscillating motion of the optical scanner 1 at a desired oscillating amplitude. That is, even though the oscillating amplitude of the optical scanner 1 fluctuates as shown in FIG. 9A, this fluctuation can be compensated.

Figure 9B:
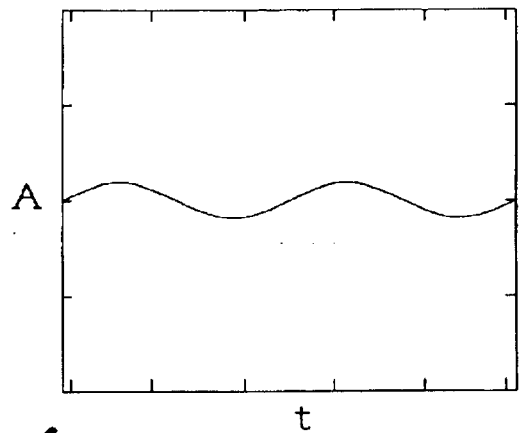
FIG. 9B is a graph showing a state where the center of oscillation fluctuates with respect to the oscillating motion of the optical scanner.
Figure 9C:
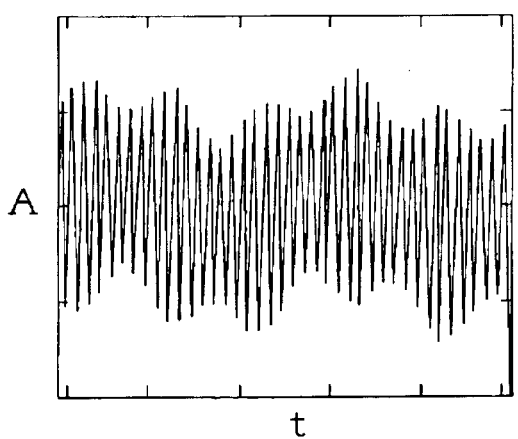
FIG. 9C is a graph showing an actual oscillating state of the optical scanner where the oscillations of FIGS. 9A and 9B are superimposed.

Here, it is assumed that the oscillating motion of a low frequency, such as that shown in FIG. 9B, other than the oscillating motion of the frequency indicated by the frequency command value is applied to the optical scanner 1. In doing so, the sensor coil 103 detects the oscillation of the low frequency, and the signal of its low frequency component is added to the output $V_s$ of the detecting circuit 3.

In the control circuit 4e of the sixth embodiment, by contrast, the signal of the low frequency component is extracted by the LPF circuit 410 and is supplied to the PI circuit 411. In the PI circuit 411, this signal is amplified by a preset gain and a resulting signal is delivered to the subtraction circuit 412.

In the subtraction circuit 412, the output of the PI circuit 411 is subtracted from the output of the gain control circuit 402 in order to cancel the low-frequency oscillating motion of the optical scanner 1. Thus, in the control circuit 4e, even though the low-frequency oscillation, such as that shown in FIG. 9B, is added to the oscillating motion of the optical scanner 1, this motion can be compensated.

Seventh Embodiment

Figure 27:
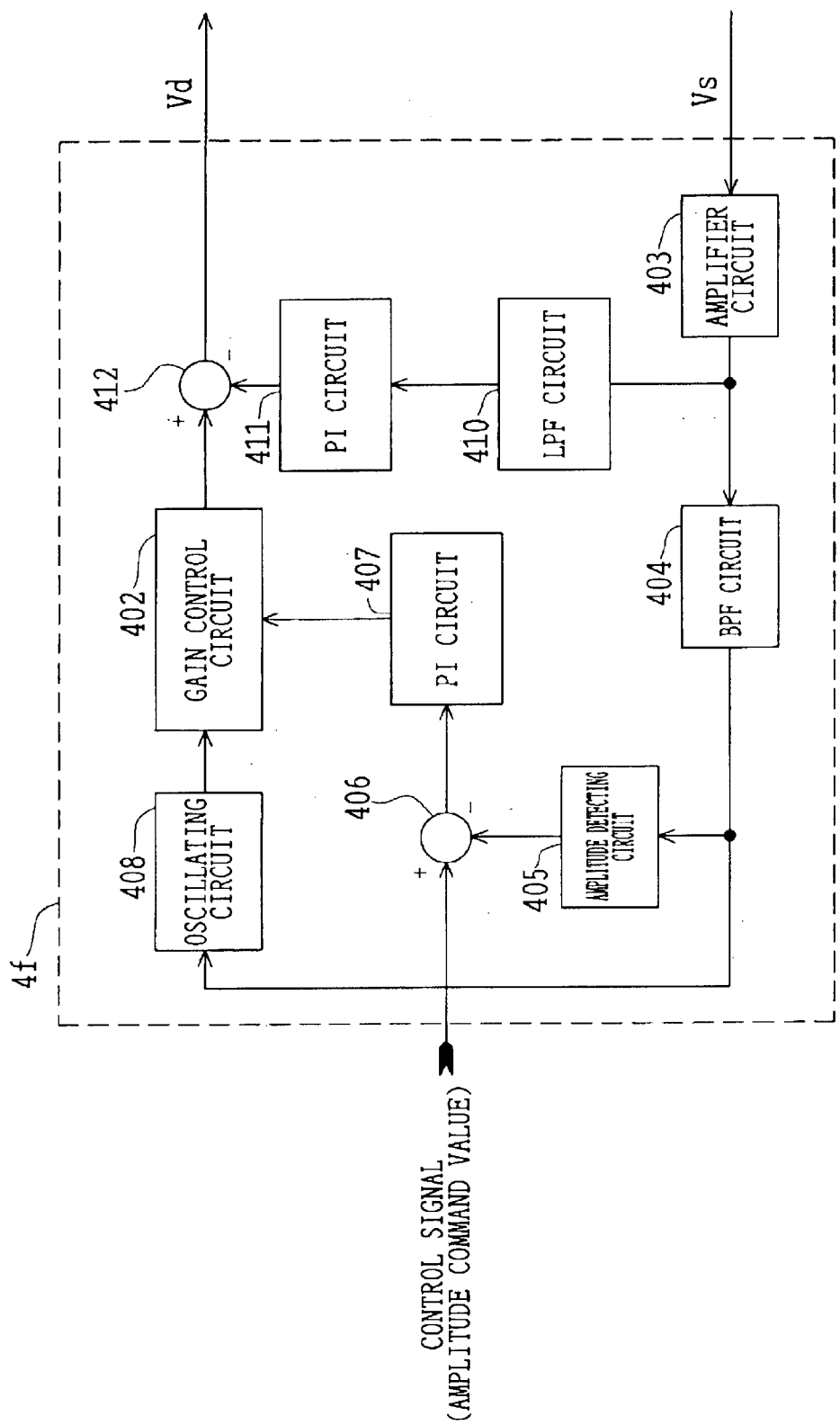
FIG. 27 is a view showing the construction of a control circuit used in a seventh embodiment of the present invention.

The seventh embodiment of the driving circuit for an optical scanner according to the present invention is characterized by the circuit configuration of a control circuit 4f shown in FIG. 27.

The control circuit 4f of this embodiment has a function (a resonant frequency follow-up control function) of oscillating the optical scanner 1 at the mechanical resonant frequency $f_c$ by constructing the positive feedback loop, unlike the control circuit 4e of the sixth embodiment, with the amplifier circuit 403, the BPF circuit 404, the phase-shifting circuit 408, the gain control circuit 402, and the subtraction circuit 412.

The control circuit 4f also has a function (an oscillating amplitude control function) of oscillating the optical scanner 1 at a desired oscillating amplitude by constructing the negative feedback loop, like the control circuit 4e of the sixth embodiment, with the amplifier circuit 403, the BPF circuit 404, the amplitude detecting circuit 405, the subtraction circuit 406, the PI circuit 407, the gain control circuit 402, and a subtraction circuit 412.

The control circuit 4f, like the control circuit 4e of the sixth embodiment, further has a function (a constant oscillation control function) of eliminating the oscillation of the optical scanner 1, other than the desired oscillating motion, by constructing the negative feedback loop with the amplifier circuit 403, an LPF (low-pass filter) circuit 410, a PI circuit 411, and the subtraction circuit 412.

The phase-shifting circuit 408 is designed to make phase adjustment so that the driving command signal $V_d$ output from the gain control circuit 402 agrees in phase with the detecting signal $V_s$ supplied to the amplifier circuit 403 (because both signals agree in phase with each other in the oscillation at the resonant frequency), and is constructed so that the signal is delivered to gain control circuit 402 by shifting the phase of the output of the BPF circuit 404. Also, the amount of phase adjustment made here is governed by the amount of phase shift at each of the amplifier circuit 403, the BPF circuit 404, the gain control circuit 402, and the subtraction circuit 412. The construction other than the above description is the same as in the sixth embodiment, and thus its explanation is omitted.

Subsequently, for the control driving circuit of an optical scanner shown in FIG. 27, a description is given of the operation with respect to only the resonant frequency follow-up control function which is peculiar to the seventh embodiment.

In the initial condition where the optical scanner 1 is not oscillated, since the output $V_s$ of the detecting circuit 3 is zero and the amplitude command value of the control signal is supplied to the subtraction circuit 406, the control signal produced in the PI circuit 407 is increased (a negative feedback gain becomes at least 1). As a result, the loop constructed with the amplifier circuit 403, the BPF circuit 404, the phase-shifting circuit 408, the gain control circuit 402, and the subtraction circuit 412 satisfies an oscillating condition, and the optical scanner 1 starts the oscillating motion at the resonant frequency. The gain control circuit 402 is operated to increase the oscillating amplitude of the optical scanner 1 until the amplitude value of the output $V_s$ of the detecting circuit 3 agrees with the amplitude command value (until the output of the subtraction circuit 406 becomes zero).

Conversely, where the amplitude value of the output $V_s$ of the detecting circuit 3 exceeds the amplitude command value, the gain control circuit 402 is operated to decrease the oscillating amplitude of the optical scanner 1.

In the control circuit 4f, the optical scanner can thus be always driven at the resonant frequency, and the oscillating condition of the optical scanner 1 can be controlled, with a high degree of accuracy, by the oscillating amplitude control and the oscillation stabilizing control.

Also, although the driving circuit for an optical scanner of the present invention is not limited to the application to the optical scanner used in each of the sixth and seventh embodiments, it can be applied to each of optical scanners constructed by other mechanisms, and the same effect as in the case where it is applied to the optical scanner in each of the above embodiments can be obtained.

Examples of optical scanners with other mechanisms, as described with reference to FIGS. 24 and 25, are disclosed in U.S. Pat. Nos. 4,990,808 and 4,919,500.

For the structure and function of such an optical scanner, the explanation is omitted to avoid repetition. However, when the driving circuits for an optical scanner of the sixth and seventh embodiments are applied to the optical scanners with these other mechanisms, as will be understood from the description of the third to fifth embodiments with reference to FIGS. 24 and 25, the oscillating motion of the optical scanner, other than the desired oscillation, can be eliminated, and high-precision amplitude control becomes possible. As a result, the driving circuit for an optical scanner in which an optical scan with permanent stability is possible can be provided.

Eighth Embodiment

Figure 29:
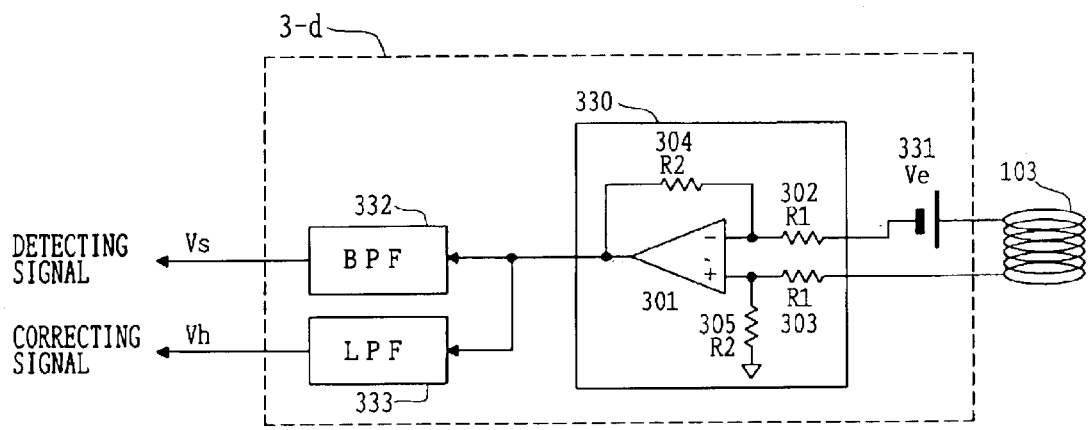
FIG. 29 is a diagram showing the configuration of a driving circuit used in an eighth embodiment of the present invention.

The driving circuit for an optical scanner of this embodiment, in which the detecting circuit 3 is constructed as a detecting circuit 3-d shown in FIG. 29, is characterized by the configuration of this detecting circuit. What follows is a description of the circuit.

In the detecting circuit 3-d shown in FIG. 29, reference numeral 331 represents a constant-voltage source ($V_e$) connected in series to the sensor coil 103.

A detecting circuit block 330 has exactly the same configuration as the detecting circuit 3-a of FIG. 6, and the its output $V_o$ is given by $$V_o = \frac{-2R_2}{2R_1 + R_{sens}} \cdot (V_r - V_e) \tag{23}$$

Reference numeral 332 represents a BPF (band-pass filter) eliminating a DC voltage component (namely, the term of $V_e$) from the output $V_o$ of the detecting circuit block 330 expressed by Eq. (23), and its output $V_s$ is as shown in Eq. (10).

The BPF 332 is used for the purpose of eliminating the DC voltage component (the term of $V_e$). Thus, a HPF (high-pass filter) may be used as a such a filter instead of the BPF.

Reference numeral 333 denotes a LPF (low-pass filter) extracting the DC voltage component (namely, the term of $V_e$) from the output $V_o$ of the detecting circuit block 330 expressed by Eq. (23), and its output $V_h$ is expressed as $$V_h = \frac{2R_2}{2R_1 + R_{sens}} \cdot V_e \tag{24}$$

As seen from this result, the output $V_h$ of the LPF 333 is a signal indicating the resistance value of the sensor coil 103.

Therefore, when the output $V_h$ of the LPF 333 is monitored by the operating controller such as a PC, not shown, it becomes possible to see how the detecting signal $V_s$ is influenced by the fluctuation of the resistance value of the sensor coil 103. Moreover, since the coefficients of Eqs. (10) and (24) are exactly the same, it is also possible to see the influence on the fluctuation of each of the operational amplifier and the resistance elements constituting the detecting circuit block 330. When the control signal supplied to the control circuit 4 is compensated in accordance with the extent of the influence, the optical scanner 1 can be controlled with a high degree of accuracy.

Ninth Embodiment

Figure 30:
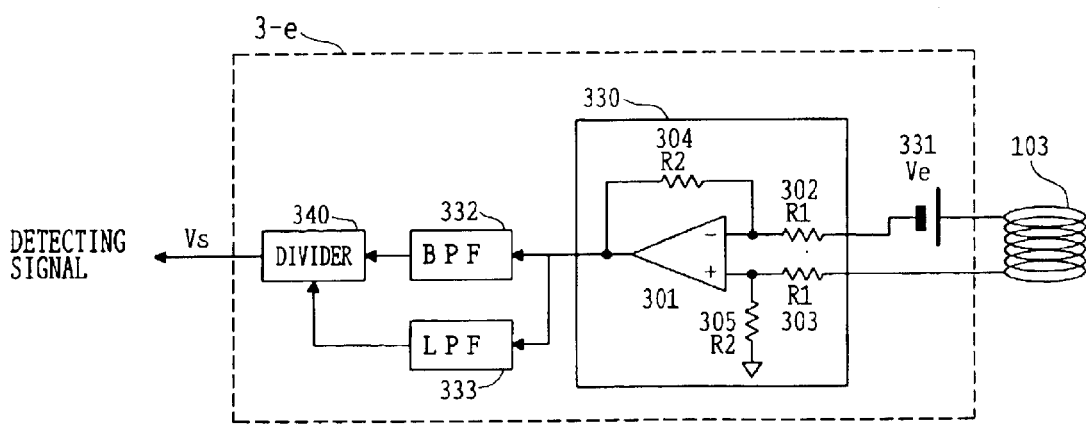
FIG. 30 is a diagram showing the configuration of a driving circuit used in a ninth embodiment of the present invention.

The driving circuit for an optical scanner of this embodiment, in which the detecting circuit 3 is constructed as a detecting circuit 3-e shown in FIG. 30, is characterized by the configuration of this detecting circuit. What follows is a description of the circuit.

In FIG. 30, the detecting circuit 3-e has the same construction as the detecting circuit 3-d of FIG. 29 with the exception of a component denoted by reference numeral 340, which is a divider for dividing the output of the BPF 332 by the output $V_h$ of the LPF 333. The detecting circuit 3-e has the output of the divider 340 as the signal $V_s$, which is given, from Eqs. (10) and (25), by $$V_s = \frac{\frac{-2R_2}{2R_1 + R_{sens}} \cdot V_r}{\frac{2R_2}{2R_1 + R_{sens}} \cdot V_e} = -\frac{V_r}{V_e} \quad (25)$$

As seen from this result, in the output $V_s$ of the divider 340, the influence on the fluctuation of each of the operational amplifier and the resistance elements constituting the detecting circuit block 330, as well as the resistance value of the sensor coil 103, is eliminated.

Thus, when the output $V_s$ of the detecting circuit 3-e (the output of the divider 340) is used, the optical scanner 1 can be controlled with a high degree of accuracy.

Figure 10:
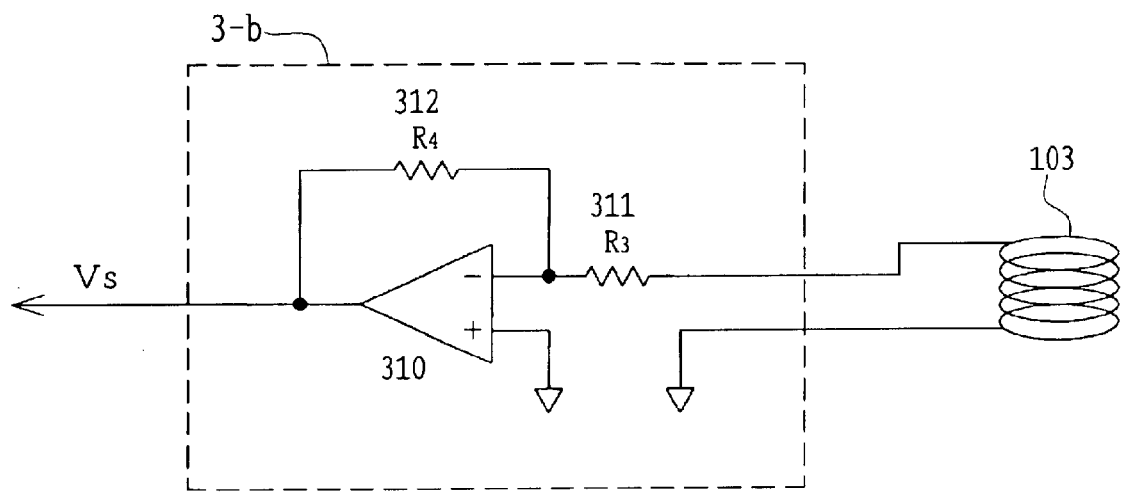
FIG. 10 is a diagram showing another example of the configuration of the detecting circuit in the circuitry of FIG. 5.
Figure 11:
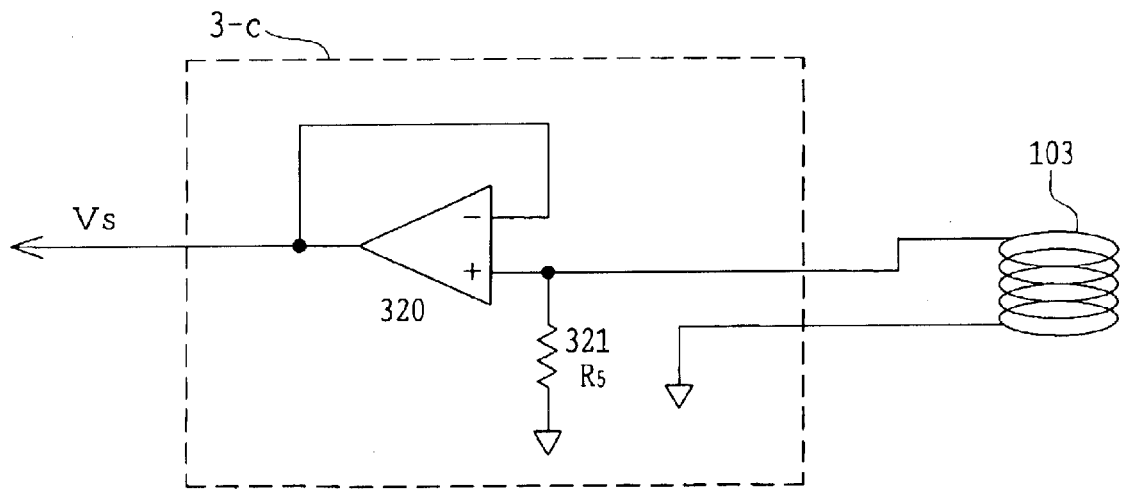
FIG. 11 is a diagram showing still another example of the configuration of the detecting circuit in the circuitry of FIG. 5.

In the ninth embodiment, the detecting circuit block 330 has exactly the same configuration as the detecting circuit 3-a of FIG. 6, but even though it has the same configuration as the detecting circuit 3-b of FIG. 10 or the detecting circuit 3-c of FIG. 11, the same effect can be secured. This reason is as follows: In the case of the detecting circuit 3-b of FIG. 10, the output $V_o$ of the detecting circuit block 330 is given by $$V_o = \frac{-R_4}{R_3 + R_{sens}} \cdot (V_r - V_e) \quad (26)$$

and in the case of the detecting circuit 3-c of FIG. 11, the output $V_o$ of the detecting circuit block 330 is given by $$V_o = \frac{R_5}{R_5 + R_{sens}} \cdot (V_r - V_e) \quad (27)$$

In either case, as in the case where the output $V_s$ of the divider 340 is found by Eqs. (23)–(25), the output $V_s$ of the divider 340 is such that the influence on the fluctuation of each of the operational amplifier and the resistance elements constituting the detecting circuit block 330, as well as the resistance value of the sensor coil 103, is eliminated.

In the ninth embodiment, the direction of connection (the polarity direction) of the constant-voltage source 331 is set to be plus (+) on the side of the sensor coil 103, but even though it is reversed, the same effect can be obtained.

Also, the driving circuit for an optical scanner of the present invention is not limited to the application to the optical scanner shown in FIG. 3, and it is also applicable to each of optical scanners with other mechanisms described with reference to FIGS. 24 and 25. In this case also, the same effect as in the case of the application to the optical scanner in each embodiment can be brought about.

What is claimed is:

1. A driving circuit for an optical scanner, comprising:
a support;
a moving plate, at least one surface of which reflects light;
elastic members connecting the support and the moving plate;
a pair of magnets arranged in the proximity of the moving plate at preset distances;
a driving coil provided on the moving plate; and
a sensor coil provided on the moving plate,
wherein the driving circuit includes:
  a current supplying device connected to the driving coil, supplying a current including at least an alternating-current component to the driving coil;
  a detecting device connected to the sensor coil, detecting an induced electromotive force generated in the sensor coil to output a detecting signal corresponding to the induced electromotive force; and
  a control device for controlling the current supplied to the driving coil by the current supplying device in accordance with the detecting signal output by the detecting device, and
wherein the control device has an oscillating frequency control device for controlling a frequency of torsional oscillation of the moving plate; a gain circuit for applying gain inversely proportional to the frequency of torsional oscillation of the moving plate to the detecting signal, at least, in a frequency band in the proximity of the frequency; and an amplitude control device for controlling an oscillating amplitude of the torsional oscillation of the moving plate in accordance with an output of the gain circuit.

2. A driving circuit for an optical scanner, comprising:
a support;
a moving plate, at least one surface of which reflects light;
elastic members connecting the support and the moving plate;
a pair of magnets arranged in the proximity of the moving plate at preset distances;
a driving coil provided on the moving plate; and
a sensor coil provided on the moving plate,
wherein the driving circuit includes:
  a current supplying device for supplying a current including at least an alternating-current component to the driving coil;
  a detecting device for detecting an induced electromotive force generated in the sensor coil to output a detecting signal corresponding to the induced electromotive force; and
  a control device for controlling the current supplied to the driving coil by the current supplying device in accordance with the detecting signal output by the detecting device,
  the control device having an oscillating frequency control device for controlling a frequency of torsional oscillation of the moving plate; a gain circuit for applying gain inversely proportional to the frequency of torsional oscillation of the moving plate to the detecting signal, at least, in a frequency band in the proximity of the frequency; and an amplitude control device for controlling an oscillating amplitude of the torsional oscillation of the moving plate in accordance with an output of the gain circuit.

3. A driving circuit for an optical scanner according to claim 2, wherein the oscillating frequency control device is a resonant frequency follow-up control device for torsion-oscillating the moving plate at a mechanical resonant frequency in accordance with the detecting signal.

4. A driving circuit for an optical scanner according to claim 2 or 3, wherein the gain circuit is constructed with a first-order low-pass filter which has a cut-off frequency much lower than the frequency of torsional oscillation of the moving plate.

5. A driving circuit for an optical scanner according to claim 2 or 3, wherein the gain circuit is constructed with a first-order band-pass filter which has a cut-off frequency much lower than the frequency of torsional oscillation of the moving plate.

6. A driving circuit for an optical scanner, comprising:
a support;

a moving plate, at least one surface of which reflects light;

elastic members connecting the support and the moving plate;

a pair of magnets arranged in the proximity of the moving plate at preset distances;

a driving coil provided on the moving plate; and a sensor coil provided on substantially the same plane as the driving coil of the moving plate, wherein the driving circuit includes:

a current supplying device for supplying a current including at least an alternating-current component to the driving coil;

a detecting device for detecting an induced electromotive force generated in the sensor coil;

a mutual induction electromotive force generating device for falsely generating a mutual induction electromotive force caused in the sensor coil, independent of the driving coil and the sensor coil, by the current including at least the alternating-current component which flows through the driving coil;

a subtraction device for subtracting an output of the mutual induction electromotive force generating device from an output of the detecting device; and a control device for controlling a torsional oscillation of the moving plate in accordance with an output of the subtraction device.

7. A driving circuit for an optical scanner according to claim 6, wherein the mutual induction electromotive force generating device has a first coil and a second coil which are provided on a fixed substrate; a second current supplying device for supplying a current containing at least an alternating-current component to the first coil; and a second detecting device for detecting an induced electromotive force generated in the second coil, the subtraction device subtraction-processing the output of the detecting device and an output of the second detecting device.

8. A driving circuit for an optical scanner, comprising:

a support;

a moving plate, at least one surface of which reflects light;

an elastic member connecting the support and the moving plate;

a magnet connected through the elastic member to the moving plate;

a driving coil provided to the support; and a sensor coil provided to the support, wherein the driving circuit includes:

a current supplying device for supplying a current containing at least an alternating-current component to the driving coil;

a detecting device for detecting an induced electromotive force generated in the sensor coil;

a mutual induction electromotive force generating device for falsely generating a mutual induction electromotive force caused in the sensor coil, independent of the driving coil and the sensor coil, by the current containing at least an alternating-current component which flows through the driving coil;

a subtraction device for subtracting an output of the mutual induction electromotive force generating device from an output of the detecting device; and a control device for controlling a torsional oscillation of the moving plate in accordance with an output of the subtraction device.

9. A driving circuit for an optical scanner according to claim 8, wherein the mutual induction electromotive force generating device has a first coil and a second coil which are provided on a fixed substrate; a second current supplying device for supplying a current containing at least an alternating-current component to the first coil; and a second detecting device for detecting an induced electromotive force generated in the second coil, the subtraction device subtraction-processing the output of the detecting device and an output of the second detecting device.

10. A driving circuit for an optical scanner according to 6 or 8, wherein the mutual induction electromotive force generating device falsely generates the mutual induction electromotive force caused in the sensor coil, independent of the driving coil and the sensor coil, in accordance with the current supplied to the driving coil.

11. A driving circuit for an optical scanner according to claim 10, wherein the mutual induction electromotive force generating device has a phase shifting device for shifting a phase of a signal produced in accordance with the current supplied to the driving coil and a variable gain device for increasing or decreasing the signal produced in accordance with the current supplied to the driving coil.

12. A driving circuit for an optical scanner according to claim 11, wherein the control device has at least one of an amplitude control device for continuously controlling an amplitude of the torsional oscillation of the moving plate in accordance with a result of the subtraction device and a frequency control device for continuously controlling a frequency of the torsional oscillation of the moving plate.

13. A driving circuit for an optical scanner according to claim 7 or 9, further including a first gain circuit increasing or decreasing a current to be supplied through the second current supplying device and a second gain circuit increasing or decreasing an output of the second detecting device.

14. A driving circuit for an optical scanner according to claim 7 or 9, wherein a mutual inductance caused by the driving coil and the sensor coil is practically equalized to a mutual inductance by the first coil and the second coil.

15. A driving circuit for an optical scanner according to claim 14, wherein the first coil is configured into substantially the same structure and shape as the driving coil, the second coil is configured into substantially the same structure and shape as the sensor coil, the second current supplying device is constructed similar to the current supplying device, and the second detecting device is constructed similar to the detecting device.

16. A driving circuit for an optical scanner, comprising:

a support;

a moving plate, at least one surface of which reflects light;

elastic members connecting the support and the moving plate;

a pair of magnets arranged in the proximity of the moving plate at preset distances;

a driving coil provided on the moving plate; and a sensor coil provided on substantially the same plane as the driving coil of the moving plate, wherein the driving circuit includes:

an oscillation driving device for supplying a current containing at least an alternating-current component to the driving coil to execute a torsional oscillation of the moving plate within a preset angle;

an oscillation detecting device for detecting an induced electromotive force generated in the sensor coil, provided with an electromotive force detecting device for outputting a detecting signal corresponding thereto;

an oscillating frequency control device for controlling a frequency of the torsional oscillation;

a first oscillating amplitude control device for controlling an amplitude of the torsional oscillation in accordance with the detecting signal output by the oscillation detecting device; and a second oscillating amplitude control device for controlling a condition of oscillation containing frequency components excluding a frequency of the torsional oscillation in accordance with a signal component in the detecting signal output by the oscillation detecting device, the signal component corresponding to the frequency components excluding the torsional oscillation.

17. A driving circuit for an optical scanner, comprising:

a support;

a moving plate, at least one surface of which reflects light;

an elastic member connecting the support and the moving plate;

a magnet connected through the elastic member to the moving plate;

a driving coil provided to the support; and a sensor coil provided to the support, wherein the driving circuit includes:

an oscillation driving device for supplying a current containing at least an alternating-current component to the driving coil to execute a torsional oscillation of the moving plate within a preset angle;

an oscillation detecting device for detecting an induced electromotive force generated in the sensor coil, provided with an electromotive force detecting device for outputting a detecting signal corresponding thereto;

an oscillating frequency control device for controlling a frequency of the torsional oscillation;

a first oscillating amplitude control device for controlling an amplitude of the torsional oscillation in accordance with the detecting signal output by the oscillation detecting device; and a second oscillating amplitude control device for controlling a condition of oscillation containing frequency components excluding a frequency of the torsional oscillation in accordance with a signal component in the detecting signal output by the oscillation detecting device, the signal component corresponding to the frequency components excluding the torsional oscillation.

18. A driving circuit for an optical scanner according to claim 16 or 17, wherein the second oscillating amplitude control device has a low-pass filter for extracting a frequency component lower than the frequency of the torsional oscillation from the detecting signal and a low-frequency oscillation eliminating device for controlling the oscillating condition of the moving plate so that an output thereof becomes zero.

19. A driving circuit for an optical scanner according to claim 16 or 17, wherein the oscillating frequency control device is provided with a resonant frequency follow-up control device for executing the torsional oscillation of the moving plate at a mechanical resonant frequency in accordance with a detecting signal.

20. A driving circuit for an optical scanner, comprising:

a support;

a moving plate, at least one surface of which reflects light;

elastic members connecting the support and the moving plate;

a pair of magnets arranged in the proximity of the moving plate at preset distances;

a driving coil provided on the moving plate; and a sensor coil provided on the moving plate, wherein the driving circuit includes:

an oscillation driving device for supplying a current containing at least an alternating-current component to the driving coil to execute a torsional oscillation of the moving plate within a preset angle;

an oscillation detecting device for detecting an oscillating condition of the moving plate in accordance with an induced electromotive force generated in the sensor coil;

an amplitude control device for controlling an amplitude of an oscillation of the moving plate in accordance with an output of the oscillation detecting device; and a frequency control device for controlling an oscillating frequency of the moving plate, the oscillation detecting device having:

a constant-voltage source connected in series to the sensor coil;

a voltage detecting device for detecting voltages created at both terminals of a series circuit comprised of the sensor coil and the constant-voltage source to output signals corresponding thereto;

a constant-voltage eliminating device for outputting a signal in which a constant-voltage component is eliminated from an output of the voltage detecting device; and a constant-voltage extracting device for extracting the constant-voltage component from the output of the voltage detecting device to output a signal corresponding thereto.

21. A driving circuit for an optical scanner, comprising:

a support;

a moving plate, at least one surface of which reflects light;

an elastic member connecting the support and the moving plate;

a magnet connected through the elastic member to the moving plate;

a driving coil provided to the support; and a sensor coil provided to the support, wherein the driving circuit includes:

an oscillation driving device for supplying a current containing at least an alternating-current component to the driving coil to execute a torsional oscillation of the moving plate within a preset angle;

an oscillation detecting device for detecting an oscillating condition of the moving plate in accordance with an induced electromotive force generated in the sensor coil;

an amplitude control device for controlling an amplitude of an oscillation of the moving plate in accordance with an output of the oscillation detecting device; and a frequency control device for controlling an oscillating frequency of the moving plate, the oscillation detecting device having:

a constant-voltage source connected in series to the sensor coil;

a voltage detecting device for detecting voltages created at both terminals of a series circuit comprised of the sensor coil and the constant-voltage source to output signals corresponding thereto;

a constant-voltage eliminating device for outputting a signal in which a constant-voltage component is eliminated from an output of the voltage detecting device; and a constant-voltage extracting device for extracting the constant-voltage component from the output of the voltage detecting device to output a signal corresponding thereto.

22. A driving circuit for an optical scanner according to claim 20 or 21, wherein the oscillation detecting device is further provided with a division device for dividing an output of the constant-voltage eliminating device by an output of the constant-voltage extracting device.

23. A driving circuit for an optical scanner, comprising:

a support;

a moving plate, at least one surface of which reflects light;

an elastic member connecting the support and the moving plate;

a magnet connected through the elastic member to the moving plate;

a driving coil provided to the support; and a sensor coil provided to the support, wherein the driving circuit includes:

an oscillation driving device for supplying a current containing at least an alternating-current component to the driving coil to execute a torsional oscillation of the moving plate within a preset angle;

an oscillation detecting device for detecting an oscillating condition of the moving plate in accordance with an induced electromotive force generated in the sensor coil;

an amplitude control device for controlling an amplitude of an oscillation of the moving plate in accordance with an output of the oscillation detecting device; and a frequency control device for controlling an oscillation frequency of the moving plate, and wherein the oscillation detecting device has:

a constant-voltage source connected in series to the sensor coil;

a voltage detecting device for detecting voltages created at both terminals of a series circuit comprised of the sensor coil and the constant-voltage source to output signals corresponding thereto;

a constant-voltage eliminating device for outputting a signal in which a constant-voltage component is eliminated from an output of the voltage detecting device; and a constant-voltage extracting device for extracting the constant-voltage component from the output of the voltage detecting device to output a signal corresponding thereto.

24. A driving circuit for an optical scanner according to claim 23, wherein the oscillation detecting device is further provided with a division device for dividing an output of the constant-voltage eliminating device by an output of the constant-voltage extracting device.

* * * * *